United States Patent
Chang et al.

(10) Patent No.: US 9,668,154 B2
(45) Date of Patent: May 30, 2017

(54) RADIO MEASUREMENT COLLECTION METHOD AND RADIO TERMINAL

(75) Inventors: Henry Chang, San Diego, CA (US); Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 182 days.

(21) Appl. No.: 13/824,303

(22) PCT Filed: Sep. 21, 2011

(86) PCT No.: PCT/JP2011/071521
§ 371 (c)(1),
(2), (4) Date: Mar. 15, 2013

(87) PCT Pub. No.: WO2012/039439
PCT Pub. Date: Mar. 29, 2012

(65) Prior Publication Data
US 2013/0178216 A1 Jul. 11, 2013

Related U.S. Application Data

(60) Provisional application No. 61/385,073, filed on Sep. 21, 2010, provisional application No. 61/385,085, filed on Sep. 21, 2010.

(51) Int. Cl.
*H04W 24/10* (2009.01)
*H04W 36/30* (2009.01)
(Continued)

(52) U.S. Cl.
CPC .......... *H04W 24/10* (2013.01); *H04B 17/24* (2015.01); *H04W 36/30* (2013.01); *H04W 36/08* (2013.01); *H04W 52/365* (2013.01)

(58) Field of Classification Search
CPC ..... H04W 24/02; H04W 24/08; H04W 24/00; H04W 24/10; H04W 36/00;
(Continued)

(56) References Cited

U.S. PATENT DOCUMENTS

2010/0190488 A1* 7/2010 Jung et al. ............. 455/67.11
2011/0143745 A1  6/2011 Wang et al.
(Continued)

FOREIGN PATENT DOCUMENTS

JP  2007104596 A  4/2007
JP  2008-042610 A  2/2008
(Continued)

OTHER PUBLICATIONS

An Office Action; "Notice of Reasons for Rejection," issued by the Japanese Patent Office on Mar. 11, 2014, which corresponds to Japanese Patent Application No. 2012-535057 and is related to U.S. Appl. No. 13/824,303; with English language statement of relevance.
(Continued)

*Primary Examiner* — George Eng
*Assistant Examiner* — Umair Ahsan
(74) *Attorney, Agent, or Firm* — Studebaker & Brackett PC

(57) ABSTRACT

A radio terminal in a connected state performs a measurement of a radio environment according to a measurement configuration set by a radio base station, and activates a timer correspond to a predetermined time. The radio terminal reports a measurement result when the measurement result becomes possible to be reported before the timer expires, and stores the measurement result together with a time stamp when the timer expired in a case where the measurement result does not become possible to be reported before the timer expires.

6 Claims, 14 Drawing Sheets

(51) Int. Cl.
*H04B 17/24* (2015.01)
*H04W 52/36* (2009.01)
*H04W 36/08* (2009.01)

(58) Field of Classification Search
CPC . H04W 36/0083; H04W 36/08; H04W 36/14; H04L 12/2697; H04L 43/50; H04B 17/0057; H04B 17/0067; H04B 17/0077
USPC ........ 455/422.1–424, 456.1, 67.11, 436–444
See application file for complete search history.

(56) References Cited

U.S. PATENT DOCUMENTS

| | | | |
|---|---|---|---|
| 2011/0195668 A1* | 8/2011 | Lee et al. | 455/67.11 |
| 2012/0106370 A1* | 5/2012 | Radulescu et al. | 370/252 |
| 2013/0090113 A1* | 4/2013 | Persson et al. | 455/424 |
| 2013/0189990 A1* | 7/2013 | Kim et al. | 455/436 |

FOREIGN PATENT DOCUMENTS

| | | |
|---|---|---|
| JP | 2008-252548 A | 10/2008 |
| JP | 2008-306240 A | 12/2008 |
| JP | 2009-111636 A | 5/2009 |
| JP | 2009-284252 A | 12/2009 |
| JP | 2010-028637 A | 2/2010 |
| JP | 2010-178234 A | 8/2010 |
| WO | 2010/017760 A1 | 2/2010 |
| WO | 2010/087625 A2 | 8/2010 |

OTHER PUBLICATIONS

3GPP TR 36.805 V9.0.0 (Dec. 2009); 3rd Generation Partnership Project; Technical Specification Group Radio Access Network; Study on Minimization of drive-tests in Next Generation Networks; (Release 9).
3GPP TS 37.320 V0.7.0 (Jun. 2010); 3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; Stage 2 (Release 10).
International Search Report; PCT/JP2011/071521; Nov. 29, 2011.
An Office Action; "Notice of Reasons for Rejection," issued by the Japanese Patent Office on Oct. 28, 2014, which corresponds to Japanese Patent Application No. 2014-179616 and is related to U.S. Appl. No. 13/824,303; with English language statement of relevance.
3GPP TS 37.320; "3rd Generation Partnership Project; Technical Specification Group TSG RAN Universal Terrestrial Radio Access (UTRA) and Evolved Universal Terrestrial Radio Access (E-UTRA); Radio measurement collection for Minimization of Drive Tests (MDT); Overall description; Stage 2 (Release 10)"; Aug. 2010; pp. 1-15; V0.7.1.

* cited by examiner

FIG. 9
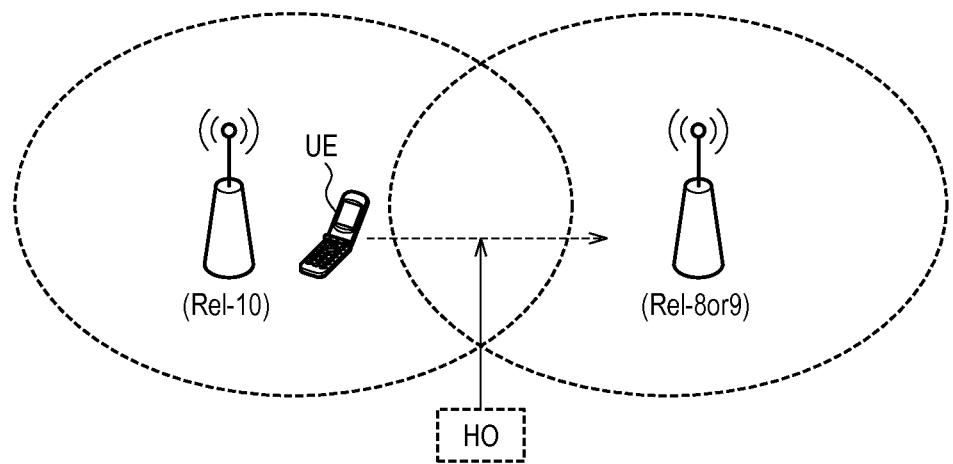
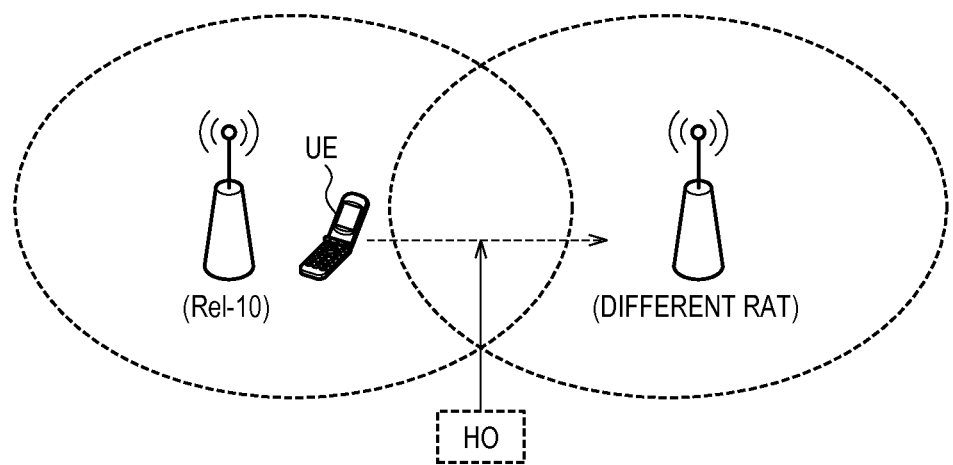
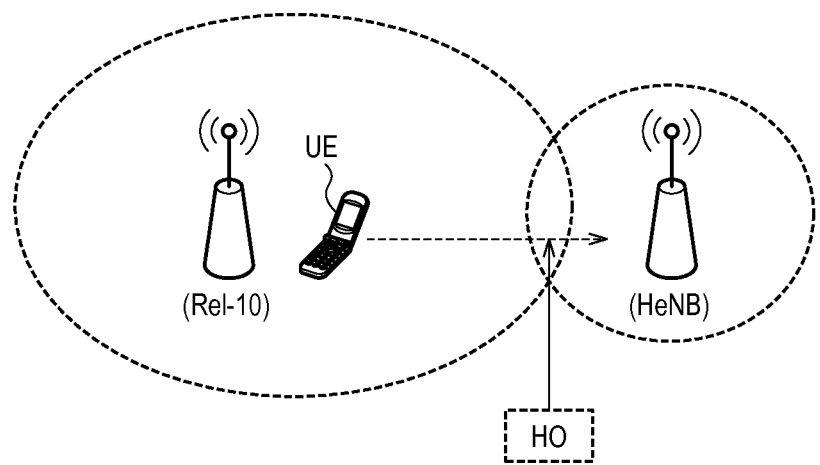

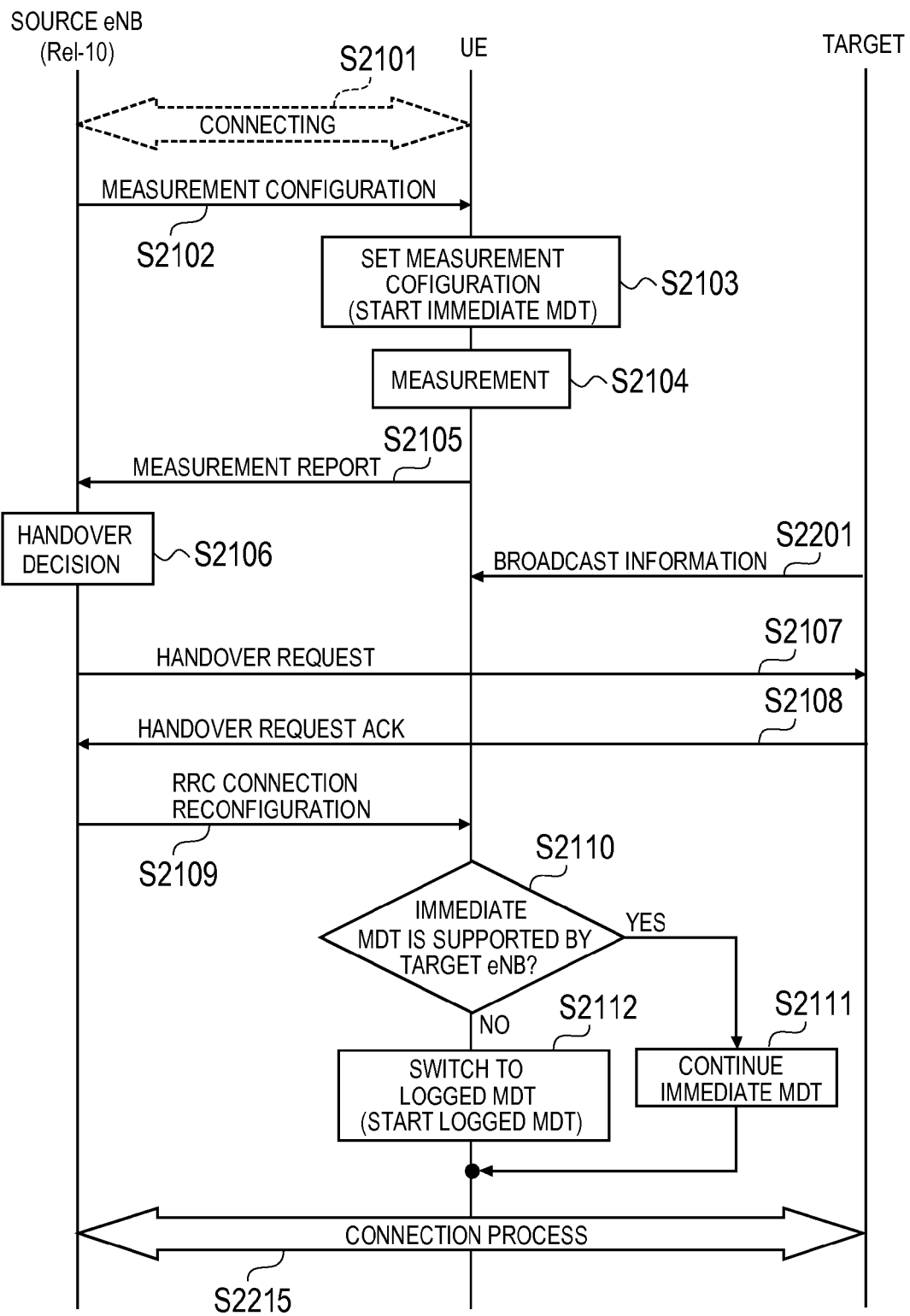

RADIO MEASUREMENT COLLECTION METHOD AND RADIO TERMINAL

TECHNICAL FIELD

The present invention relates to a radio measurement collection method and radio terminal to measure and collect a radio environment.

BACKGROUND ART

In a mobile communication system, a radio environment for a radio base station changes as a building is constructed in a surrounding area of the radio base station or an installed situation of a base station in a surrounding area of the radio base station changes. For this reason, a drive test has been performed by an operator to measure and collect a radio environment using a measurement vehicle in which measurement equipment is mounted.

These measurement and collection of the radio environment can contribute to optimizing the coverage of a radio base station, for example. However, there is a problem such that there includes many processes and thus the cost is increased. For this reason, developed in the 3GPP (3rd Generation Partnership Project), which is a standardization project of a mobile communication system, are specifications of MDT (Minimization of Drive Test) which is a technique in which a radio terminal being held by a user is used to automate measurement and collection of a radio environment.

The MDT includes an Immediate-report-type and a Logged-type. The immediate-report-type MDT (hereinafter referred to as an Immediate MDT when needed) is such that a radio terminal in a connected state performs measurement and a result of the measurement (hereinafter referred to as a "measurement result") is reported to a network together with location information. Here, the connected state is a state where a radio terminal is executing communications. The logged-type MDT (hereinafter referred to as a Logged MDT when needed) is such that a radio terminal performs measurement when a set condition is fulfilled and the measurement result is stored together with the location information and time information as MDT data, and, thereafter, is reported to the network.

CITATION LIST

Non-Patent Literature

Non-Patent Literature 1: 3GPP TR 36.805 V9.0.0 "Study on Minimization of drive-tests in Next Generation Networks", 2009-12
Non-Patent Literature 1: 3GPP TS 37.320 v0.7.0, "Radio measurement collection for Minimization of Drive Tests (MDT)", 2010-07

SUMMARY OF THE INVENTION

And now, in the Immediate MDT, a radio terminal is not always possible to report a measurement result. For example, when congestion occurs in a serving radio base station or a radio environment is deteriorated, a radio terminal cannot report a measurement result to the network. In a case where the measurement result cannot be reported to the network, if the radio terminal immediately deletes the measurement result, there is a possibility that not only a resource of the radio terminal is wasted but also the measurement result necessary for optimization cannot be sufficiently collected.

Further, radio base stations in conformity with the 3GPP release 10 (hereinafter, Rel-10) UMTS/LTE can support the MDT. However, radio base station in conformity with another RAT (Radio Access Technology) such for example as GSM or CDMA2000, and UMTS/LTE before the Rel-10 do not support the MDT. A radio terminal which performs measurement processing of the immediate report type aborts the immediate report type of measurement processing when performing a handover to a radio base station not supporting the MDT. In such a case, measurement results and location information during the handover or after the handover cannot be collected, which poses a problem that the measurement results and location information necessary for optimization cannot be collected sufficiently.

Thus, the present invention provides a radio measurement collection method and a radio terminal which can properly handle the case where a measurement result cannot be reported in the Immediate-report-type MDT.

In addition, the present invention provides a radio measurement collection method and a radio terminal capable of sufficiently collecting measurement results and location information necessary for optimization.

A feature of a radio measurement collection method according to the present invention is summarized as a radio measurement collection method, comprising the steps of: performing immediate-report-type measurement processing by a radio terminal in a connected state according to a measurement configuration set by a radio base station; activating a timer correspond to a predetermined time by the radio terminal; reporting a measurement result by the radio terminal when the measurement result becomes possible to be reported before the timer expires; and storing the measurement result by the radio terminal together with a time stamp when the timer expired in a case where the measurement result does not become possible to be reported before the timer expires.

This feature allows the radio terminal to try to report the measurement result until the timer expires. Also, when the measurement result cannot be reported by the time when the timer expires, the measurement result is stored, so that the measurement result can be reported later to the network. Accordingly, the above-described feature can properly handle the case where the measurement result cannot be reported in the immediate-report-type MDT.

Other feature of a radio measurement collection method according to the present invention is summarized as follows, in the aforementioned feature of the radio measurement collection method. In the activation step, the timer is activated when the measurement is performed.

Other feature of a radio measurement collection method according to the present invention is summarized as follows, in the aforementioned feature of the radio measurement collection method. The time stamp indicates a time when the measurement is performed.

Other feature of a radio measurement collection method according to the present invention is summarized as follows, in the aforementioned feature of the radio measurement collection method. In the reporting step, the measurement result is reported together with location information corresponding to the measurement.

Other feature of a radio measurement collection method according to the present invention is summarized as follows, in the aforementioned feature of the radio measurement collection method. In the storing step, the measurement result is stored together with the time stamp and location information corresponding to the measurement.

Other feature of a radio measurement collection method according to the present invention is summarized as follows, in the aforementioned feature of the radio measurement collection method. The radio measurement collection method further comprises the step of performing switching by the radio terminal from the immediate-report-type measurement processing to logged-type measurement processing after the timer expired.

Other feature of a radio measurement collection method according to the present invention is summarized as follows, in the aforementioned feature of the radio measurement collection method. The radio measurement collection method further comprises the step of reporting the measurement result, time information, and the time stamp which are stored in the storing step by the radio terminal when the measurement result and the time stamp which are stored in the storing step become possible to be reported.

Other feature of a radio measurement collection method according to the present invention is summarized as follows, in the aforementioned feature of the radio measurement collection method. The time information contains information indicating a relative time between a measuring time and a reporting time and information indicating an absolute time which corresponds to the reporting time and is managed inside the radio terminal.

Other feature of a radio measurement collection method according to the present invention is summarized as follows, in the aforementioned feature of the radio measurement collection method. The radio measurement collection method further comprises the step of calculating the measuring time by the radio base station which receives the measurement result and the time information, wherein in the step of calculating the measuring time, the measuring time is calculated from information indicating an absolute time which is managed on a network side and information indicating a relative time by using the information indicating the absolute time which is managed on the network side in place of the information indicating the absolute time which is managed inside the radio terminal.

A feature of a radio measurement collection method according to the present invention is summarized as a radio measurement collection method, comprising the steps of: performing immediate-report-type measurement processing by a radio terminal in a connected state according to a measurement configuration set by a radio base station; activating a timer correspond to a predetermined time by the radio terminal; reporting the measurement result by the radio terminal to the radio base station when the measurement result becomes possible to be reported before the timer expires; and deleting the measurement result by the radio terminal when the timer expired in a case where the measurement result does not become possible to be reported before the timer expires.

This feature allows the radio terminal to try to report the measurement result until the timer expires. Also, when the measurement result cannot be reported by the time when the timer expires, the measurement result is deleted, so that the load of the radio terminal can be reduced. Accordingly, the above-described feature can properly handle the case where the measurement result cannot be reported in the immediate-report-type MDT.

A feature of a radio terminal according to the present invention is summarized as a radio terminal, comprising: a storage unit; a radio communication unit configured to perform a radio communication with a radio base station; and a controller configured to control the storage unit and the radio communication unit, wherein the controller is configured: to perform immediate-report-type measurement processing in a connected state according to a measurement configuration set by the radio base station; to activate a timer correspond to a predetermined time; to report the measurement result to the radio base station when the measurement result becomes possible to be reported before the timer expires; and to store the measurement result together with a time stamp when the timer expired in a case where the measurement result does not become possible to be reported before the timer expires.

A feature of a radio terminal according to the present invention is summarized as a radio terminal, comprising: a storage unit; a radio communication unit configured to perform a radio communication with a radio base station; and a controller configured to control the storage unit and the radio communication unit, wherein the controller is configured: to perform immediate-report-type measurement processing according to a measurement configuration set by the radio base station; to activate a timer correspond to a predetermined time; to report the measurement result to the radio base station when the measurement result becomes possible to be reported before the timer expires; and to delete the measurement result when the timer expired in a case where the measurement result does not become possible to be reported before the timer expires.

A feature of the radio measurement collection method according to the present invention is summarized as follows. A radio measurement collection method comprises the steps of: performing an immediate report type of measurement processing by a radio terminal in a connected mode with a first radio base station supporting an MDT; switching by the radio terminal from the immediate report type of measurement processing to a logged type of measurement processing in response to a trigger of a handover to a second radio base station not supporting the MDT; and performing the logged type of measurement processing by the radio terminal after switching to the logged type of measurement processing. Here, the first radio base station refers to a radio base station which belongs to RAT supporting the MDT and which supports the MDT. The second radio base station refers to a radio base station which belongs to RAT not supporting MDT, or a radio base station which does not support MDT and which belongs to RAT supporting MDT.

According to the feature, the radio terminal switches from the immediate report type of measurement processing to the logged type of measurement processing in response to a trigger of a handover to a radio base station not supporting the MDT. This enables the measurement processing to be continued so that the radio environment during or after the handover can be measured. Therefore, measurement results and location information necessary for optimization can be collected sufficiently.

Other feature of the radio measurement collection method according to the present invention relates to the radio measurement collection method according to aforementioned feature and is summarized as follows. The step of performing the immediate report type of measurement processing includes the steps of: measuring a radio environment in accordance with a measurement configuration set by the first radio base station; and reporting a measurement result and location information to the first radio base station, and the step of performing the logged type of measurement processing includes the steps of: measuring a radio environment in accordance with a measurement configuration set by the first radio base station or a measurement configuration set in advance in the radio terminal; and storing a measurement result and location information. The measurement configuration set by the first radio base station may be a measurement configuration corresponding to the immediate report type of measurement processing, or a measurement configuration set by the first radio base station with the absolute time again.

Other feature of the radio measurement collection method according to the present invention relates to the radio measurement collection method according to aforementioned feature and is summarized as follows. The radio measurement collection method further comprises the steps of: performing a handover by the radio terminal from the second radio base station to a third radio base station supporting the MDT after starting the logged type of measurement processing; and reporting the measurement result and the location information stored at the step of storing, and time information to the third radio base station, wherein the third radio base station is the first radio base station or a radio base station different from the first radio base station.

Other feature of the radio measurement collection method according to the present invention relates to the radio measurement collection method according to aforementioned feature and is summarized as follows. The time information reported to the third radio base station includes information indicating a relative time between a measurement time and a report time, and information indicating an absolute time which corresponds to the report time and is managed inside the radio terminal.

Other feature of the radio measurement collection method according to the present invention relates to the radio measurement collection method according to aforementioned feature and is summarized as follows. The radio measurement collection method further comprises the step of determining by the radio terminal whether or not the second radio base station supports the MDT, wherein in the step of switching, the immediate report type of measurement processing is switched to the logged type of measurement processing when the second radio base station is determined as not supporting the MDT.

Other feature of the radio measurement collection method according to the present invention relates to the radio measurement collection method according to aforementioned feature and is summarized as follows. The trigger of the handover is a case where the radio terminal is instructed to perform a handover by the first radio base station.

Other feature of the radio measurement collection method according to the present invention relates to the radio measurement collection method according to aforementioned feature and is summarized as follows. The radio measurement collection method further comprises the step of receiving, by the radio terminal, information indicating whether or not the second radio base station supports the MDT from the first radio base station, wherein in the step of determining, the radio terminal determines whether or not the second radio base station supports the MDT based on the received information in the step of receiving.

Other feature of the radio measurement collection method according to the present invention relates to the radio measurement collection method according to aforementioned feature and is summarized as follows. The radio measurement collection method further comprises the step of receiving, by the radio terminal, information notified by the second radio base station, wherein the information notified by the second radio base station includes information indicating whether or not the second radio base station supports the immediate report type of measurement processing, and in the step of determining, the radio terminal determines whether or not the second radio base station supports the MDT based on the received information in the step of receiving.

A feature of the radio terminal according to the present invention is summarized as follows. A radio terminal comprises: a first measurement processor configured to perform an immediate report type of measurement processing with a first radio base station supporting an MDT, when the radio terminal is in a connected mode; a second measurement processor configured to perform measurement processing of the logged type, then the ratio terminal is in the connected mode; and a measurement controller configured to switch from the immediate report type of measurement processing to the logged type of measurement processing in response to a trigger of a handover to a second radio base station not supporting the MDT.

BRIEF DESCRIPTION OF THE DRAWINGS

FIG. 9 is a view for explaining a case where a radio terminal performs a handover to a radio base station not supporting an MDT while an Immediate MDT is being executed with a radio base station supporting the MDT.

FIG. 14 is a sequence diagram indicating a radio measurement collection method according to a modification example of the fourth embodiment of the present invention.

DESCRIPTION OF THE EMBODIMENTS

Figure 1:
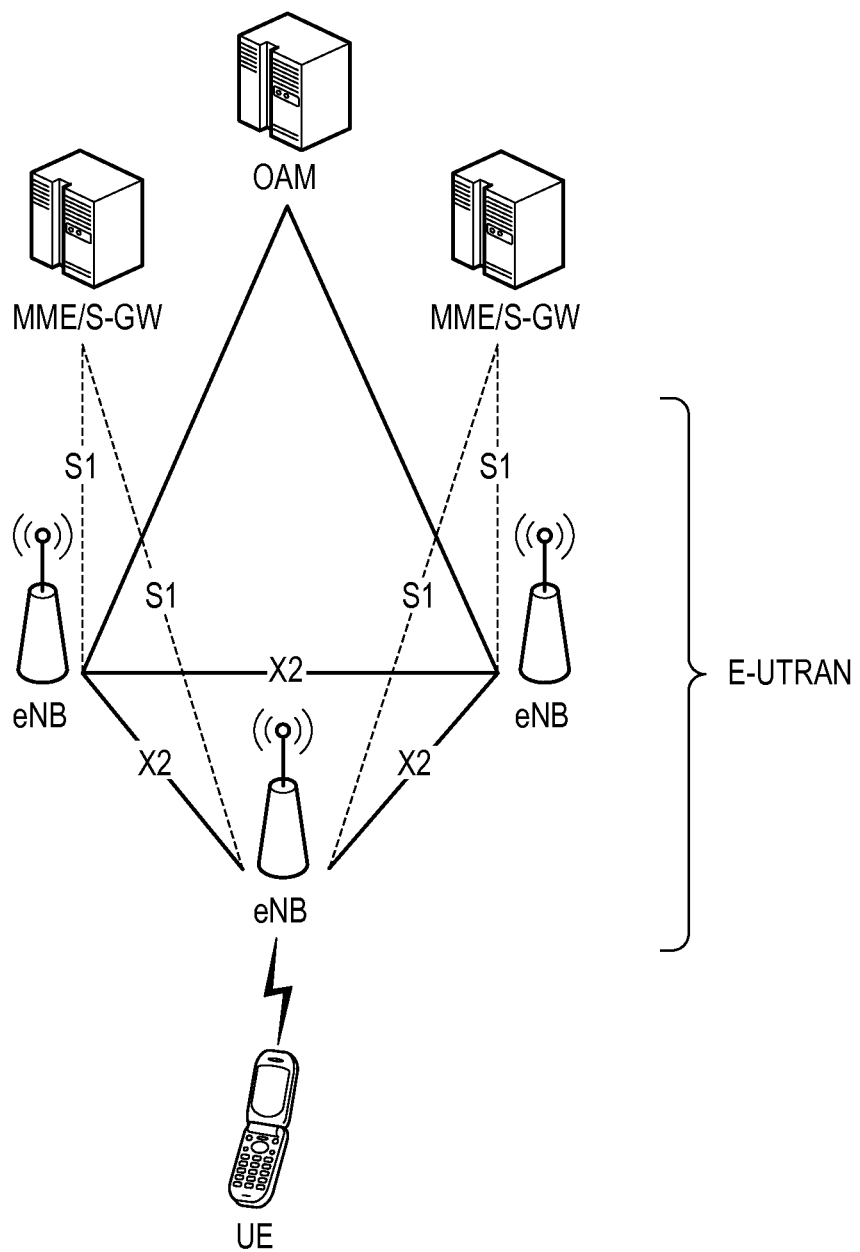
FIG. 1 is a drawing generally showing a schematic configuration of a mobile communication system according to the first to third embodiments of the present invention.

By referring to the drawings, first to fourth embodiments and other embodiments of the present invention are described. In the drawings of the embodiments, same or similar reference signs are given to denote same or similar portions.

Hereinafter, the description is mainly given to a mobile communication system which is configured based on the LTE (Long Term Evolution) whose specifications are formulated by the 3GPP. However, it should be noted that the present invention can be applied to a mobile communication system or the like which is configured based on not only the LTE but also W-CDMA (Wideband Code Division Multiple Access).

(1) First Embodiment

Hereinafter, the description is given in the following order of (1.1) Outline of Mobile Communication System, (1.2) Configuration of Radio Base Station, (1.3) Configuration of Radio Terminal, (1.4) Radio Measurement Collection Method, and (1.5) Effects of First Embodiment.

(1.1) Outline of Mobile Communication System

FIG. 1 is a drawing generally showing a schematic configuration of a mobile communication system 1 according to a first embodiment.

As shown in FIG. 1, the mobile communication system 1 has a radio terminal UE (User Equipment), a plurality of radio base stations eNB (evolved Node-B), a maintenance and monitoring device OAM (Operation and Maintenance), and a plurality of mobility management devices MME (Mobility Management Entity)/a gateway device S-GW (Serving Gateway).

The plurality of radio base stations eNB configures E-UTRAN (Evolved-UMTS Terrestrial Radio Access Network). Each radio base station eNB forms a cell which is a communication area to provide the radio terminal UE with a service. The radio terminal UE is a radio communication device which is held by a user and is also referred to as user equipment.

The adjacent radio base stations eNB can communicate with one another via an X2 interface which is a logical communication path to provide communications between base stations. Each of the plurality of radio base stations eNB can communicate with EPC (Evolved Packet Core), specifically, MME (Mobility Management Entity)/S-GW (Serving Gateway) via an S1 interface. Also, each radio base station eNB can communicate with the maintenance and monitoring device OAM which is operated by an operator.

(1.2) Configuration of Radio Base Station

Figure 2:
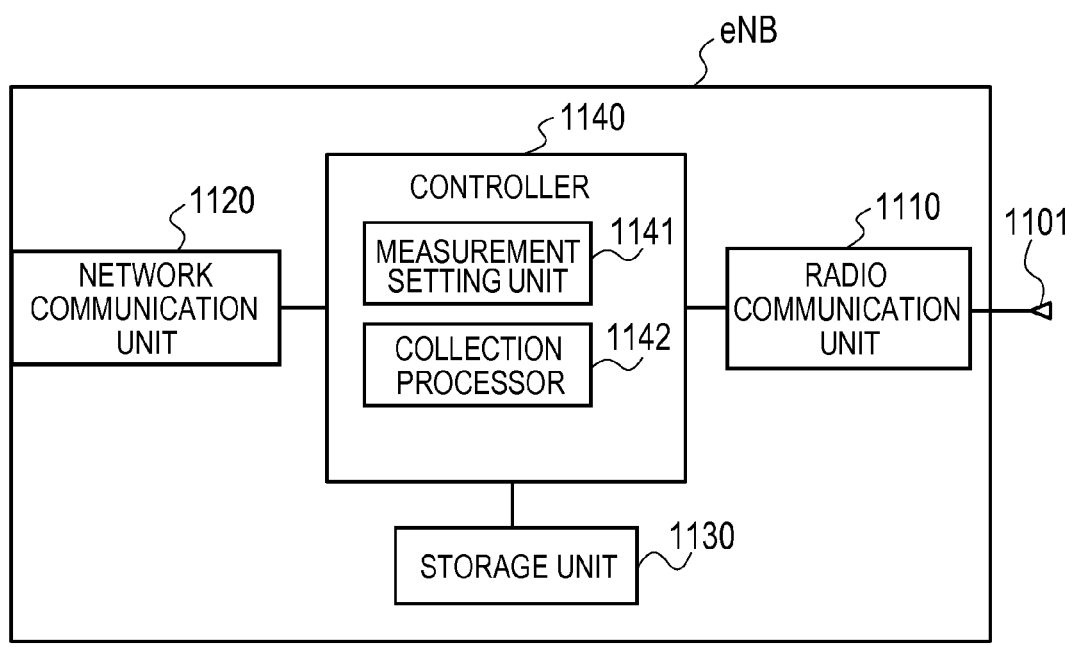
FIG. 2 is a block diagram showing a configuration of a radio base station according to the first to third embodiments of the invention.

FIG. 2 is a block diagram showing a configuration of the radio base station eNB.

As shown in FIG. 2, the radio base station eNB has an antenna 1101, a radio communication unit 1110, a network communication unit 1120, a storage unit 1130, and a controller 1140.

The antenna 1101 is used for transmission and reception of radio signals. The radio communication unit 1110 is configured using, for example, a radio frequency (RF) circuit or a baseband (BB) circuit and transmits/receives a radio signal via the antenna 1101. Also, the radio communication unit 1110 modulates a transmission signal and demodulates a receiving signal. The network communication unit 1120 communicates with other network devices (such as the maintenance and monitoring device OAM and other radio base stations eNB). The storage unit 1130 is configured using, for example, a memory, and stores a various pieces of information to be used for control of the radio base station eNB or the like. The controller 1140 is configured using, for example, a CPU and controls various kinds of functions included in the radio base station eNB.

The controller 1140 has a measurement setting unit 1141 and a collection processor 1142.

The measurement setting unit 1141 sets a measurement configuration for a radio terminal UE in a connected state. Specifically, the measurement setting unit 1141 creates a MEASUREMENT CONFIGURATION message containing the measurement configuration. The measurement configuration contains a parameter indicating a kind of a radio environment to be measured and a parameter indicating a kind of a report trigger. The kind of a radio environment to be measured is, for example, reference signal receiving power (RSRP) and a reference signal receiving quality (RSRQ), or a power headroom (PH). The kind of a report trigger is, for example, periodic, that a RSRP and/or RSRQ of a serving cell are deteriorated lower than a threshold, or a radio link failure. Then, the measurement setting unit 1141 controls the radio communication unit 1110 so as to transmit the MEASUREMENT CONFIGURATION message to the radio terminal UE.

The collection processor 1142 performs processing of collecting measurement results.

In the Immediate MDT, the collection processor 1142 acquires the measurement result to which location information is added, which is contained in a MEASUREMENT REPORT message received from the radio terminal UE, and adds a time stamp to the measurement result and the location information. After that, the collection processor 1142 controls the network communication unit 1120 so as to transmit a set of the measurement result, the location information, and the time stamp to the maintenance and monitoring device OAM. Note that the collection processor 1142 may be used for interpreting the contents of the information and optimizing a parameter of a local station without being limited to the case where the information is transmitted to the maintenance and monitoring device OAM. Also, in the Immediate MDT, the collection processor 1142 may measure uplink signal strength or a signal to interference and noise ratio (SINR).

In the Logged MDT, the collection processor 1142 creates a UEInformationRequest message when an RRCConnectionSetupComplete message containing log-holding information indicating that MDT data is held is received from the radio terminal UE and when it is determined that the MDT data is collected, and then controls the radio communication unit 1110 so as to transmit the created UEInformationRequest message to the radio terminal UE.

When the radio communication unit 1110 receives a UEInformationResponse massage transmitted (reported) from the radio terminal UE in response to the UEInformationRequest message, the collection processor 1142 acquires the MDT data contained in the received UEInformationResponse message. After that, the collection processor 1142 controls the network communication unit 1120 so as to transmit the MDT data to the maintenance and monitoring device OAM. Note that the collection processor 1142 may be used for interpreting the contents of the MDT data and optimizing a parameter of a local station without being limited to the case where the MDT data is transmitted to the maintenance and monitoring device OAM.

(1.3) Configuration of Radio Terminal

Figure 3:
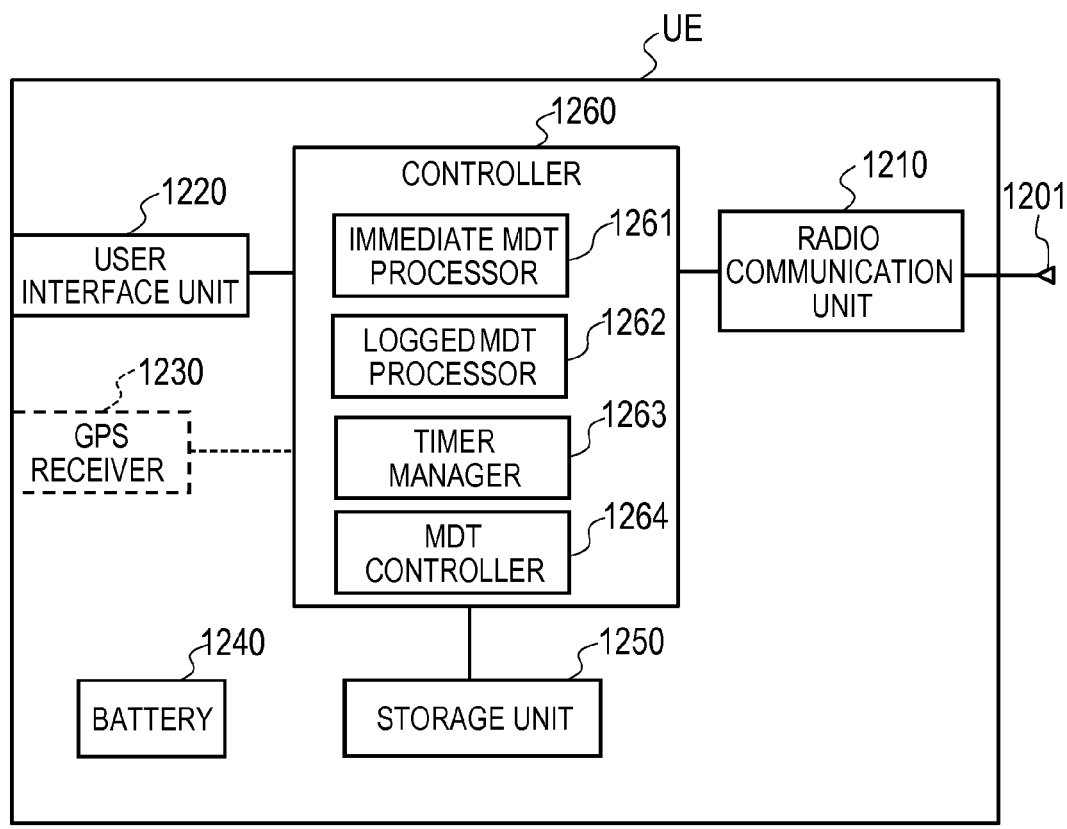
FIG. 3 is a block diagram showing a configuration of a radio terminal according to the first to third embodiments of the invention.

FIG. 3 is a block diagram showing a configuration of the radio terminal UE.

As shown in FIG. 3, the radio terminal UE has an antenna 1201, a radio communication unit 1210, a user interface unit 1220, a GPS receiver 1230, a battery 1240, a storage unit 1250, and a controller 1260. However, it is not necessary that the radio terminal UE has the GPS receiver 1230.

The antenna 1201 is used for transmission and reception of radio signals. The radio communication unit 1210 is configured using, for example, a radio frequency (RF) circuit or a baseband (BB) circuit, and transmits/receives a radio signal via the antenna 1201. Also, the radio communication unit 1210 modulates a transmission signal and demodulates a receiving signal. The user interface unit 1220 is a display or a button to function as an interface with a user. The battery 1240 stores power which is supplied to each block of the radio terminal UE. The storage unit 1250 is configured using, for example, a memory, and stores a various pieces of information to be used for control of the radio base station eNB or the like. The controller 1260 is configured using, for example, a CPU and controls various kinds of functions included in the radio terminal UE.

The controller 1260 has an Immediate MDT processor 1261, a Logged MDT processor 1262, a timer manager 1263, and an MDT controller 1264.

The Immediate MDT processor 1261 performs Immediate MDT with the radio base station eNB in a connected state. Specifically, when the radio communication unit 1210 receives a MEASUREMENT CONFIGURATION message containing the measurement configuration in the connected state, the Immediate MDT processor 1261 sets the measurement configuration contained in the received MEASUREMENT CONFIGURATION message (in other words, stores in the storage unit 1250). The measurement configuration contains a parameter indicating a kind of a radio environment to be measured and a parameter indicating a kind of a report trigger.

In addition, the Immediate MDT processor 1261 measures the radio environment and creates location information indicating a location when the measurement is performed according to the parameter indicating the kind of a radio environment to be measured. The location information contains ECGI (E-UTRAN cell Global Identifier) of a serving cell. Also, when the radio terminal UE has a positioning function, the location information further contains GNSS (Global Navigation, Satellite System) location information. On the other hand, when the radio terminal UE does not have the positioning function, the location information further contains an RF (Radio frequency) finger print relating to a receiving state from an adjacent cell.

The timer manager 1263 manages a timer to clock for a certain period of time. Specifically, the timer manager 1263 activates a timer when the Immediate MDT processor 1261 conducts measurement. Also, the timer manager 1263 monitors after the timer is activated if the timer expired.

When the MEASUREMENT REPORT message can be transmitted to the radio base station eNB, the immediate MDT processor 1261 controls the radio communication unit 1210 so as to transmit the MEASUREMENT REPORT message containing the measurement result to which the location information is added according to the parameter indicating the kind of a report trigger. Note that the case where the MEASUREMENT REPORT message can be transmitted to the radio base station eNB means a case where an uplink radio resource is assigned from the radio base station eNB and the uplink radio quality is equal to or higher than a predetermined level. Also, the case where the MEASUREMENT REPORT message cannot be transmitted to the radio base station eNB means a case where an uplink radio resource is not assigned from the radio base station eNB, or where the uplink radio quality is lower than a predetermined level. The Immediate DMT processor 1261 periodically tries transmission of the MEASUREMENT REPORT message until the timer expires.

When the timer expired while the MEASUREMENT REPORT message remains incapable of being transmitted to the radio base station eNB, the Immediate MDT processor 1262 acquires a time stamp indicating a time when the measurement is performed. Specifically, the radio terminal UE acquires a time stamp indicating the time which is acquired as the time when the measurement is performed, in such a manner that a current time is subtracted by a certain time corresponding to the timer (in other words, the time when the measurement is performed). After that, the radio terminal UE stores a set of the measurement result, the location information, and the time stamp as MDT data.

The Logged MDT processor 1262 performs Logged MDT in a connected state (hereinafter referred to as a Logged MDT in connected when needed). The Logged MDT processor 1262 performs measurement according to the measurement configuration set by the radio base station eNB or the measurement configuration which is set in the radio terminal UE in advance, and stores the measurement result and the location information. For example, the Logged MDT processor 1262 performs measurement of RSRP and RSRQ or PH according to the parameter indicating the kind of a radio environment to be measured, which is contained in the MEASUREMENT CONFIGURATION message. Also, the Logged MDT processor 1262 creates the location information indicating the location when the measurement is performed and a time stamp relating to the time when the measurement is performed. After that, the radio terminal UE stores a set of the measurement result, the location information, and the time stamp as the MDT data (stores in the storage 1250).

Note that a reporting method procedure for logs (MDT data) collected by the Logged MDT in connected may include both an approach in which, similar to the Immediate MDT currently standardized by the 3GPP, a report is transmitted like a normal RRM measurement report when the radio terminal UE moves to a base station supporting the MDT and an approach in which, similar to the Logged MDT in idle, 1-bit log-holding information is contained in the RRCconnectionsetupcomplete message and the log is collected by the judgment of the network.

The MDT controller 1264 controls the Immediate MDT processor 1261 and the Logged MDT processor 1262. Specifically, the MDT controller 1264 performs switching from the Immediate MDT to the Logged MDT in connected when the timer expires or after the timer expired in the case where the timer expired while the MEASUREMENT REPORT message remains incapable of being transmitted to the radio base station eNB.

Figure 4:
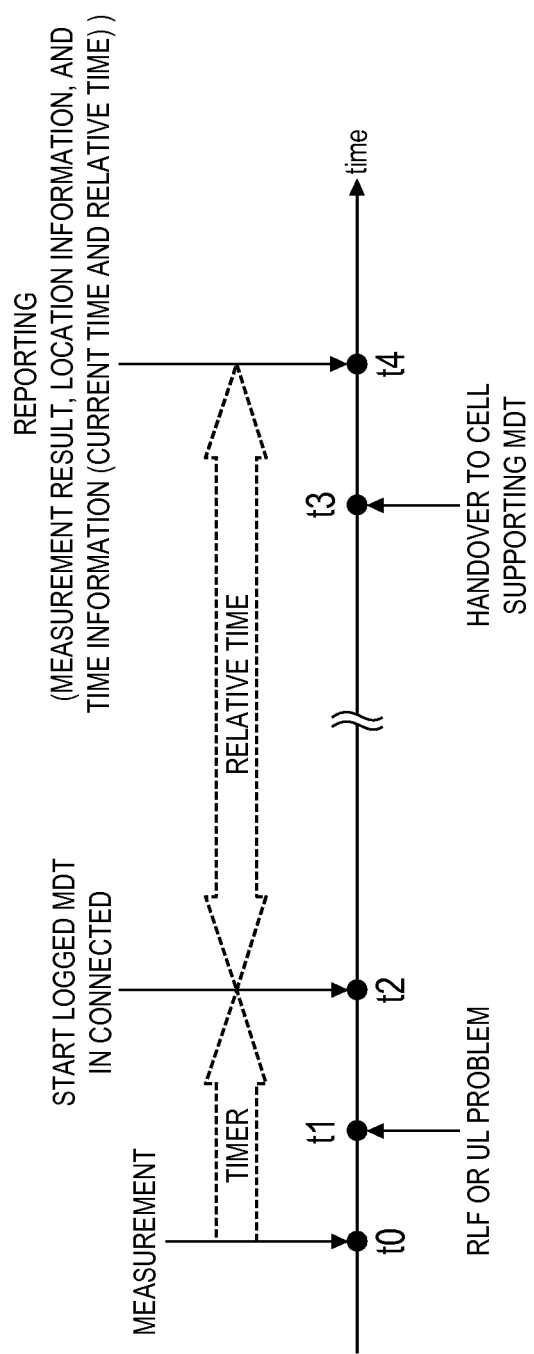
FIG. 4 is a time chart for illustrating an operation of a radio terminal UE in a case of switching from Immediate MDT to Logged MDT in connected.

FIG. 4 is a time chart for illustrating an operation of the radio terminal UE when switching from the Immediate MDT to the Logged MDT in connected is performed.

As shown in FIG. 4, at time t0, the Immediate MDT processor 1261 measures a radio environment and creates location information indicating a location when the measurement is performed. In addition, the timer manager 1263 activates a timer.

At time t1, a radio link failure (RLF) or an uplink (UL) problem occurs. At this time, the Immediate MDT processor 1261 detects a state where the measurement result and the location information cannot be reported to the radio base station.

At time t2, when the timer expired, the MDT controller 1264 controls so that the measurement result and the location information acquired at time t0 are stored as MDT data (logs). Also, the MDT controller 1264 controls the Logged MDT processor 1262 so as to start Logged MDT in connected. The Logged MDT processor 1262 starts the Logged MDT in connected according to the measurement configuration set by the radio base station eNB or the measurement configuration which is set in advance. In addition, the Logged MDT processor 1262 stores information indicating an absolute time which is managed inside the radio terminal UE when the timer expired (in other words, information indicating time t2).

At time t3, the radio terminal UE performs handover to a radio base station (a cell) supporting MDT.

At time t4, the Logged MDT processor 1262 reports the measurement result to the radio base station supporting MDT. Here, the Logged MDT processor 1262 reports the measurement result, the location information, and the time information at time t0 when the measurement is performed. The time information contains a time stamp indicating time t0 when the measurement is performed, information indicating a current absolute time (Day, Hour, Min, Sec) which is managed inside the radio terminal UE (in other words, time information corresponding to time t4) and information indicating a relative time between time t4 and time t0. When the Logged MDT in connected does not have the measurement configuration which is set by the radio base station eNB, the absolute time which is managed inside the radio terminal UE is not reliable enough. For this reason, the base station calculates a gap between the reported time t4 of the radio terminal UE and the absolute time of the network, and then writes reliable information over the report t0. In this manner, the radio base station which has received the report can calculate time information (Day, Hour, Min, Sec) corresponding to the time when the measurement is performed based on the absolute time, the relative time, and the timer time when the report is made in accordance with the absolute time of the network.

(1.4) Radio Measurement Collection Method

Figure 5:
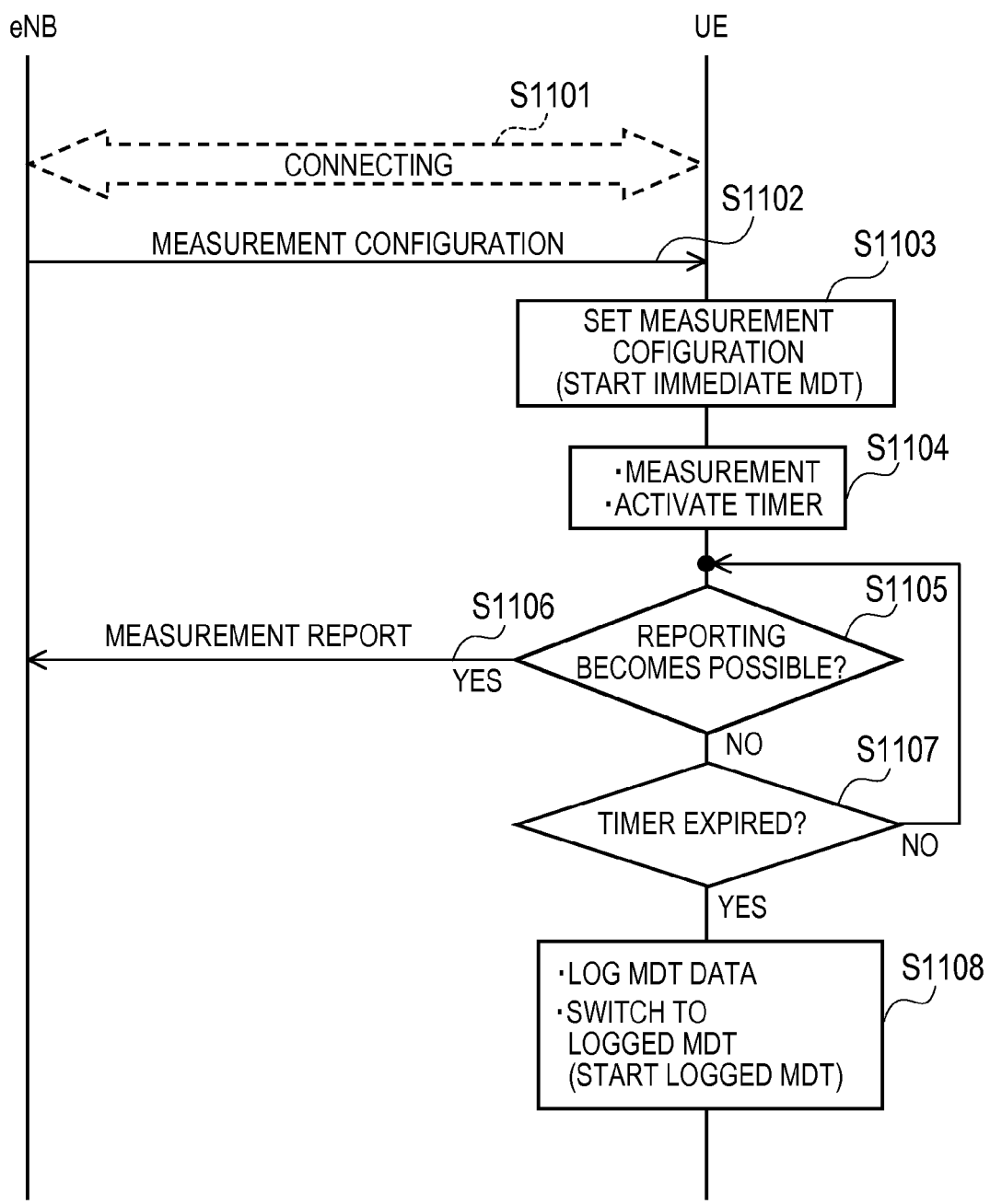
FIG. 5 is a sequence diagram showing a radio measurement collection method according to a first embodiment of the invention.

FIG. 5 is a sequence diagram showing a radio measurement collection method according to the first embodiment.

As shown in FIG. 5, at step S1101, the radio terminal UE is in a connected state and uses the cell of the radio base station eNB as a serving cell.

At step S1102, the radio base station eNB transmits a MEASUREMENT CONFIGURATION message containing the measurement configuration to the radio terminal UE. The radio terminal UE receives the MEASUREMENT CONFIGURATION message. Here, the measurement configuration contains a parameter indicating a kind of a radio environment to be measured and a parameter indicating a kind of a report trigger. The radio environment is, for example, reference signal receiving power (RSRP) and a reference signal receiving quality (RSRQ) or a power headroom (PH). Also, when the RSRP and RSRQ are measured, the kind of a report trigger is periodic, that a RSRP and/or RSRQ of a serving cell are deteriorated lower than a threshold, or a radio link failure.

At step S1103, the radio terminal UE sets the measurement configuration contained in the received MEASUREMENT CONFIGURATION message to start Immediate MDT.

At step S1104, the radio terminal UE measures the radio environment according to the parameter indicating the kind of a radio environment to be measured. Note that the radio base station eNB may measure uplink signal strength or a signal to interference and noise ratio (SINR). Also, the radio terminal UE creates location information indicating a location when the measurement is performed. The location information contains ECGI (E-UTRAN Cell Global Identifier) of the serving cell. Also, when the radio terminal UE has a positioning function, the location information further contains GNSS (Global Navigation Satellite System) location information. On the other hand, when the radio terminal UE does not includes the positioning function, the location information further contains an RF (Radio Frequency) finger print relating to a receiving state from the adjacent cell. The radio terminal UE temporarily stores the measurement result and the location information. Furthermore, the radio terminal UE activates a timer to clock for a certain period of time.

At step S1106, when the MEASUREMENT REPORT message can be transmitted to the radio base station eNB (step S1105; YES), the radio terminal UE transmits the MEASUREMENT REPORT message containing the measurement result to which the location information is added to the radio base station eNB according to the parameter indicating the kind of the report trigger. After the report of the measurement result has been completed as described above, the radio terminal UE can delete the measurement result and the location information.

Note that the case where the MEASUREMENT REPORT message can be transmitted to the radio base station eNB means a case where an uplink radio resource is assigned from the radio base station eNB and the uplink radio quality is equal to or higher than a predetermined level. The radio base station eNB receives the MEASUREMENT REPORT message. Also, the radio base station eNB stores the measurement result to which the location information is added, which is contained in the MEASUREMENT REPORT message, and transmits the measurement result to which the location information is added to the maintenance and monitoring device OAM.

At step S1107, the radio terminal UE checks if the timer expired when the MEASUREMENT REPORT message cannot be transmitted to the radio base station eNB (step S1105; NO). When the timer did not expire (step S1107; NO), the radio terminal UE returns to step S1105. On the other hand, when the timer expired (step S1107; YES), the radio terminal UE proceeds to step S1108.

At step S1108, the radio terminal UE acquires a time stamp indicating the time when the measurement is performed. Specifically, the radio terminal UE acquires a time stamp indicating the time which is acquired as the time when the measurement is performed, in such a manner that a current time is subtracted by a certain time corresponding to the timer (in other words, the time when the measurement is performed). After that, the radio terminal UE stores a set of the measurement result, the location information, and the time stamp as MDT data. Also, the radio terminal UE performs switching from the Immediate MDT to the Logged MDT in connected. Specifically, in the Logged MDT in connected, the radio terminal UE measures the RSRP and RSRQ or PH according to the parameter indicating the kind of the radio environment to be measured, which is contained in the MEASUREMENT CONFIGURATION message received at S1102. Also, the radio terminal UE creates location information indicating a location when the measurement is performed in the Logged MDT in connected and a time stamp indicating a time when the measurement is performed, and stores a set of the measurement result, the location information, and the time stamp as MDT data. Note that the radio environment to be measured may follow the measurement configuration which is set in the radio terminal UE in advance. Also, other than the measurement configuration associated with a measurement processing for the immediate-type report, all the trigger types such as event trigger base measurement and periodic base measurement can be supported.

(1.5) Effects of First Embodiment

As described above, according to the first embodiment, the radio terminal UE in the connected state measures the radio environment according to the measurement configuration which is set by the radio base station eNB and activates a timer. When the measurement result becomes possible to be reported before the timer expires, the radio terminal UE reports the measurement result to the radio base station eNB together with the location information, while when the measurement result does not become possible to be reported, the radio terminal UE stores the measurement result together with the location information and the time stamp when the timer expired.

With this configuration, the radio terminal UE can try to report the measurement result and the location information until the timer expires. Also, when the measurement result cannot be reported by the time when the timer expires, the measurement result is stored together with the location information and the time stamp. Accordingly, the measurement result can be reported later together with the location information and the time stamp to the network.

Also, since a plurality of measurement results can be stored in the UE even when the uplink (UL) is congested or the downlink (DL) operates without any problem but the UL holds some problem to prevent Immediate MDT from being performed for a longer time, so that the network can acquire the measurement result without exception.

(2) Second Embodiment

In the above-described first embodiment, when the measurement result does not become possible to be reported before the timer expires, the radio terminal UE stores the measurement result together with the location information and the time stamp when the timer expired, and performs switching from the Immediate MDT to the Logged MDT in connected.

In a second embodiment, when a measurement result does not become possible to be reported before a timer expires, a radio terminal UE stores the measurement result together with location information and a time stamp when the timer expired, and, thereafter, when the measurement result becomes possible to be reported, the radio terminal UE reports the measurement result together with the location information and the time stamp.

Figure 6:
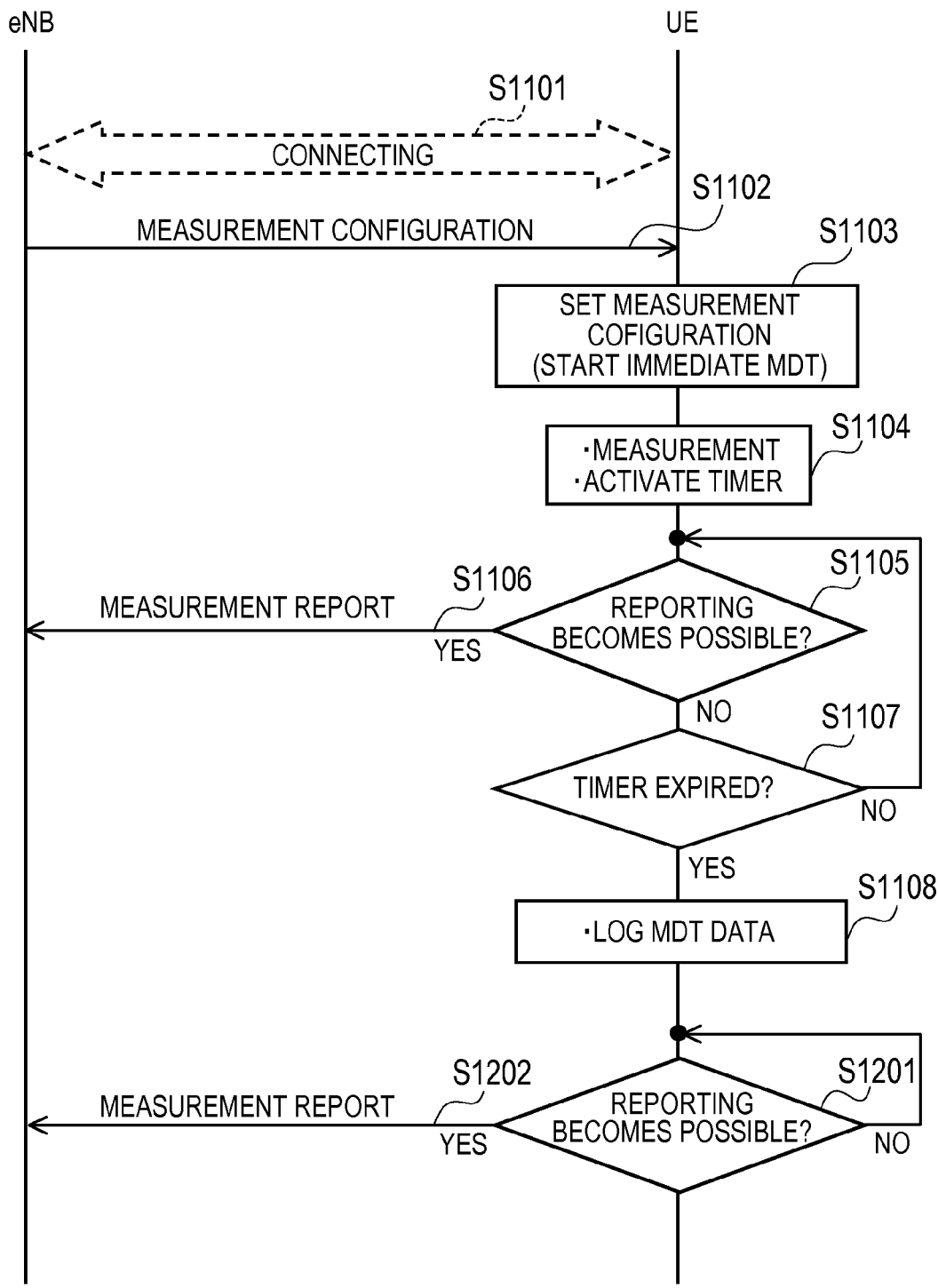
FIG. 6 is a sequence diagram showing a radio measurement collection method according to a second embodiment of the invention.

FIG. 6 is a sequence diagram showing a radio measurement collection method according to the second embodiment.

As shown in FIG. 6, at step S1101, the radio terminal UE is in a connected state, and uses a cell of a radio base station eNB as a serving cell.

At step S1102, the radio base station eNB transmits a MEASUREMENT CONFIGURATION message containing a measurement configuration to the radio terminal UE. The radio terminal UE receives the MEASUREMENT CONFIGURATION message.

At step S1103, the radio terminal UE sets the measurement configuration contained in the received MEASUREMENT CONFIGURATION message, and starts Immediate MDT.

At step S1104, the radio terminal UE measures a radio environment according to a parameter indicating a kind of a radio environment to be measured. Also, the radio terminal UE creates location information indicating a location when the measurement is performed. The radio terminal UE temporarily stores the measurement result and the location information. Furthermore, the radio terminal UE activates a timer to clock for a certain period of time.

At step S1106, when the MEASUREMENT REPORT message can be transmitted to the radio base station eNB (step S1105; YES), the radio terminal UE transmits the MEASUREMENT REPORT message containing the measurement result to which the location information is added to the radio base station eNB according to the parameter indicating a kind of a report trigger. After the report of the measurement result has been completed as described above, the radio terminal UE can delete the measurement result and the location information.

At step S1107, the radio terminal UE checks if the timer expired when the MEASUREMENT REPORT message cannot be transmitted to the radio base station eNB (step S1105; NO). When the timer did not expire (step S1107; NO), the radio terminal UE returns to step S1105. On the other hand, when the timer expired (step S1107; YES), the radio terminal UE proceeds to step S1108.

At step S1108, the radio terminal UE acquires a time stamp indicating a time when the measurement is performed. Then, the radio terminal UE stores a set of the measurement result, the location information, and the time stamp as MDT data.

At step S1201, the radio terminal UE checks if the MEASUREMENT CONFIGURATION message can be transmitted to the radio base station eNB. Note that when an uplink radio resource is assigned from the radio base station eNB and the uplink radio quality is equal to or higher than a predetermined level, the MEASUREMENT CONFIGURATION message can be transmitted to the radio base station eNB.

At step S1202, when the MEASUREMENT CONFIGURATION message can be transmitted to the radio base station eNB (step S1201; YES), the radio terminal UE transmits the MEASUREMENT REPORT message containing the measurement result, the location information, and the time stamp which are stored at step S1108 to the radio base station eNB. After the report has been completed as described above, the radio terminal UE can delete the MDT data (the measurement result, the location information, and the time stamp) which is stored at step S1108.

As described above, according to the second embodiment, when the MEASUREMENT REPORT message can be transmitted to the radio base station eNB after the timer expired, the MEASUREMENT REPORT message containing the stored measurement result, location information, and time stamp to the radio base station eNB. As compared with the first embodiment, this configuration can reduce the load that the radio terminal UE holds the measurement result, the location information, and the time stamp.

(3) Third Embodiment

In the above-described first embodiment, when the measurement report does not become possible to be reported before the timer expires, the radio terminal UE stores the measurement result together with the location information and the time stamp when the timer expired, and performs switching from the Immediate MDT to the Logged MDT in connected. Also, in the above-described second embodiment, when the measurement result does not become possible before the timer expires, the radio terminal UE stores the measurement result together with the location information and the time stamp when the timer expired and reports the measurement result together with the location information and the time stamp when reporting becomes possible.

In a third embodiment, when a measurement result does not become possible to be reported before a timer expires, a radio terminal UE deletes the measurement result and location information when the timer expired.

Figure 7:
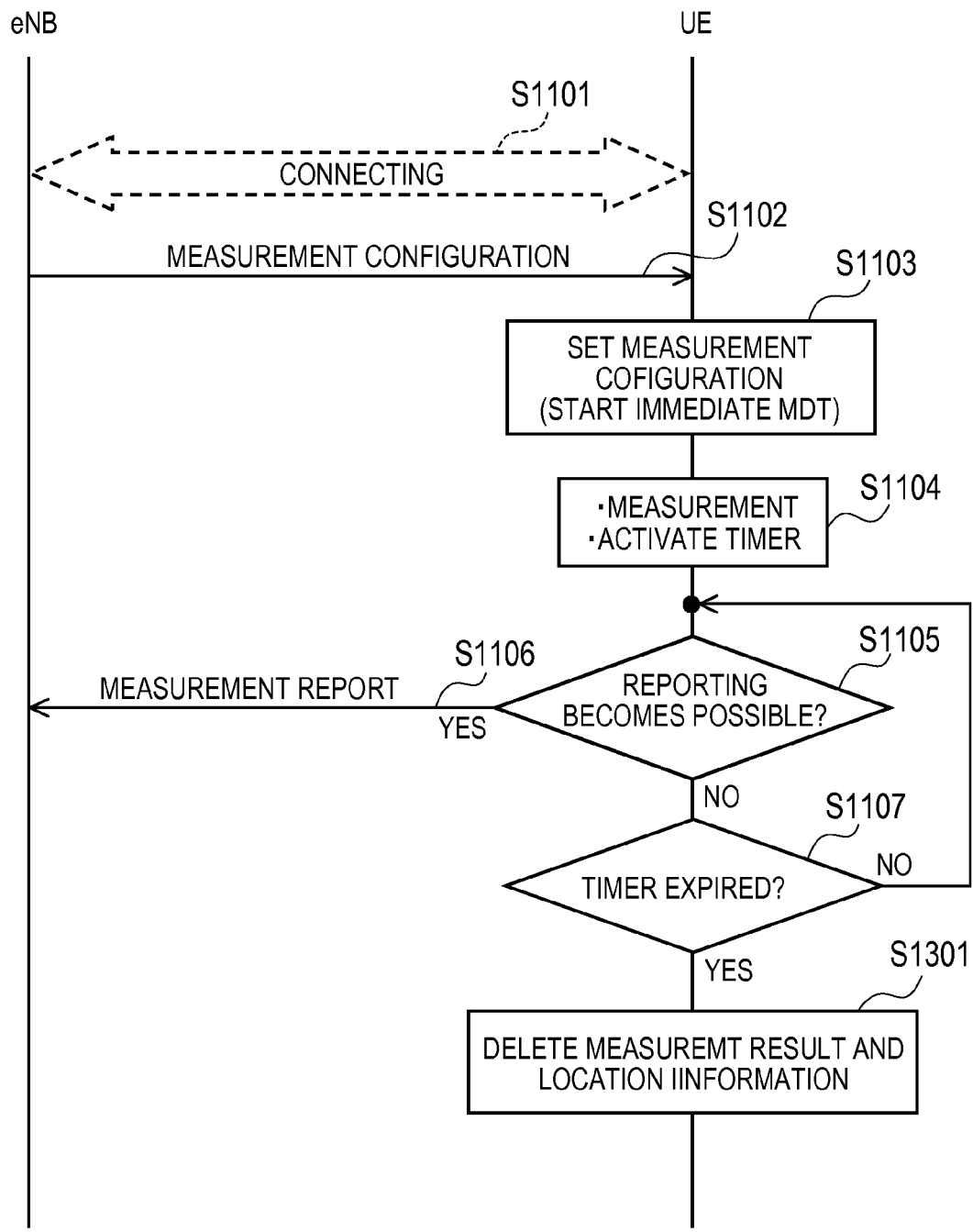
FIG. 7 is a sequence diagram showing a radio measurement collection method according to a third embodiment of the invention.

FIG. 7 is a sequence diagram showing a radio measurement collection method according to the third embodiment. Here, the description is mainly given to a difference with the first embodiment and the second embodiment.

As shown in FIG. 7, at step S1101, the radio terminal UE is in a connected state and uses a cell of a radio base station eNB as a serving cell.

At step S1102, the radio base station eNB transmits a MEASUREMENT CONFIGURATION message containing a measurement configuration to the radio terminal UE. The radio terminal UE receives the MEASUREMENT CONFIGURATION message.

At step S1103, the radio terminal UE sets the measurement configuration contained in the received MEASUREMENT CONFIGURATION message and starts Immediate MDT.

At step S1104, the radio terminal UE measures a radio environment according to a parameter indicating a kind of a radio environment to be measured. Also, the radio terminal UE creates location information indicating a location when the measurement is performed. The radio terminal UE temporarily stores the measurement result and the location information. Furthermore, the radio terminal UE activates a timer to clock for a certain period of time.

At step S1106, when the MEASUREMENT REPORT message can be transmitted to the radio base station eNB (step S1105; YES), the radio terminal UE transmits the MEASUREMENT REPORT message containing the measurement result to which the location information is added to the radio base station eNB according to the parameter indicating the kind of the report trigger. After the report of the measurement result has been completed as described above, the radio terminal UE can delete the measurement result and the location information.

At step S1107, the radio terminal UE checks if the timer expired when the MEASUREMENT REPORT message cannot be transmitted to the radio base station eNB (step S1105; NO). When the timer did not expire (step S1107; NO), the radio terminal UE returns to step S1105. On the other hand, when the timer expired (step S1107; YES), the radio terminal UE proceeds to step S1301.

At step S1301, the radio terminal UE deletes the measurement result and the location information which are acquired at step S1104.

As described above, according to the third embodiment, when the timer expired, the measurement result and the location information are deleted. As compared with the first embodiment and the second embodiment, this can reduce the load that the radio terminal UE holds the measurement result, the location information, and the time stamp.

(4) Fourth Embodiment

The fourth embodiment of the present invention is described with reference to the drawings in the following order: (4.1) Overview of Mobile Communication System; (4.2) Configuration of Radio Base Station; (4.3) Configuration of Radio Terminal; (4.4) Radio Measurement Collection Method; (4.5) Effects of Fourth Embodiment; and (4.6) Modification Example of Fourth Embodiment. The same or similar portions are denoted by the same or similar reference numerals in the drawings of the fourth embodiment given below.

A mobile communication system configured based on LTE (Long Term Evolution) under the specifications decided by 3GPP are mainly described below. Note that the present invention is not limited to the LTE, but also can be applied to a mobile communication system configured based on W-CDMA (Wideband Code Division Multiple Access) or the like.

(4.1) Overview of Mobile Communication System

Figure 8:
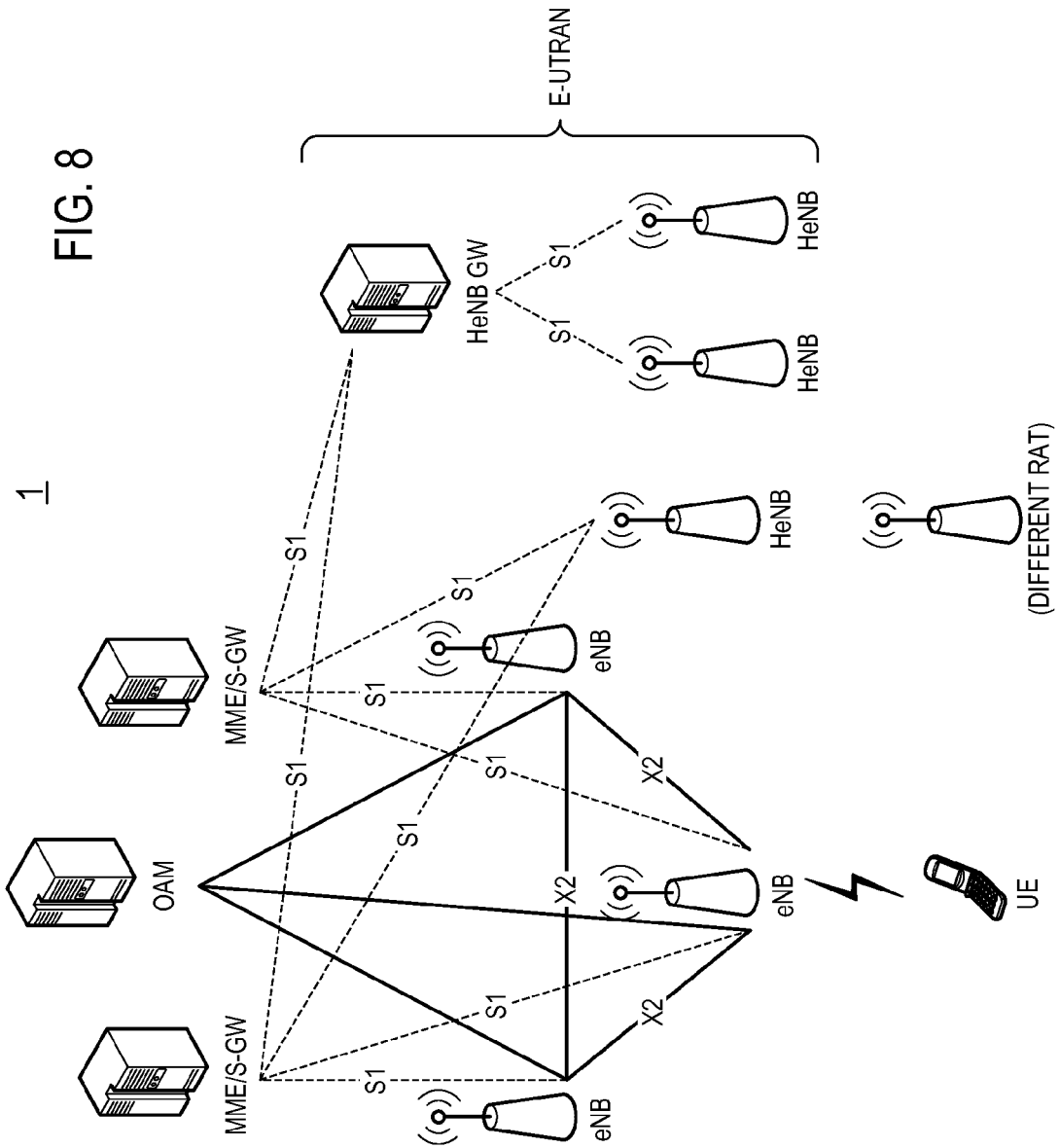
FIG. 8 is a diagram illustrating an overall schematic configuration of a mobile communication system according to a fourth embodiment of the present invention.

FIG. 8 is a diagram illustrating an overall schematic configuration of a mobile communication system 1 according to the present embodiment.

As shown in FIG. 8, the mobile communication system 1 includes a radio terminal UE (User Equipment), multiple radio base stations eNB (evolved Node-B), a maintenance monitor device OAM (Operation and Maintenance), multiple mobility management devices MME (Mobility Management Entity)/gateway devices S-GW (Serving Gateway), multiple home radio base stations HeNB (Home evolved Node-B), and a home radio base station gateway HeNB GW (Home evolved Node-B Gateway).

The radio base stations eNB, the home radio base stations HeNB, and the home radio base station gateway HeNB GW form an E-UTRAN (Evolved-UMTS Terrestrial Radio Access Network). Each of the radio base stations eNB and the home radio base stations HeNB manages a cell serving as a communication area for providing a service to the radio terminal UE.

The radio terminal UE is a radio communication device owned by a user, and is also referred to as a user device. In the fourth embodiment, the radio terminal UE is configured in conformity with the Rel-10.

The neighboring radio base stations eNB can communicate with each other via an X2 interface which is a logical communication path providing communication between the base stations. Each of the multiple radio base stations eNB can communicate with an EPC (Evolved Packet Core), specifically the MME/S-GW, via an S1 interface. Furthermore, each of the radio base stations eNB is communicable with the maintenance monitor device OAM operated by an operator.

Each of the home radio base stations HeNB can communicate with an EPC, specifically the MME/S-GW via an S1 interface and the home radio base station gateway HeNB GW.

Further, the radio terminal UE may be capable of communications with a radio base station in conformity with a radio access technology (RAT) different from the E-UTRAN (or UTRAN).

Among the radio base stations eNB, some radio base stations eNB conform to the Rel-10 support the MDT. On the other hand, the home radio base station HeNB and a radio base station in conformity with a RAT different from the E-UTRAN (or UTRAN) do not support the MDT.

Here, with reference to FIG. 9, description is provided for a case where the radio terminal UE performs a handover to a radio base station not supporting the MDT while executing an Immediate MDT with the radio base station eNB supporting the MDT.

As shown in FIG. 9, the radio terminal UE performs an Immediate MDT before a handover. In other words, the radio terminal UE measures a radio environment, and reports a measurement result and location information to the radio base station eNB.

When performing a handover to a radio base station not supporting the MDT, the radio base station UE aborts such an Immediate MDT. In this case, a measurement report around a cell edge of the radio base station eNB supporting the MDT cannot be sufficiently collected. Accordingly, there is a possibility that a coverage of the radio base station eNB supporting the MDT or the like cannot be optimized.

Furthermore, because measurement in a cell of the radio base station not supporting the MDT is not sufficiently performed, there is a possibility that a coverage or the like of the radio base station not supporting the MDT cannot be optimized.

Therefore, in the fourth embodiment, the radio terminal UE switches from the Immediate MDT to a Logged MDT in response to the handover from the radio base station eNB supporting the MDT to the radio base station not supporting the MDT.

(4.2) Configuration of Radio Base Station

Figure 10:
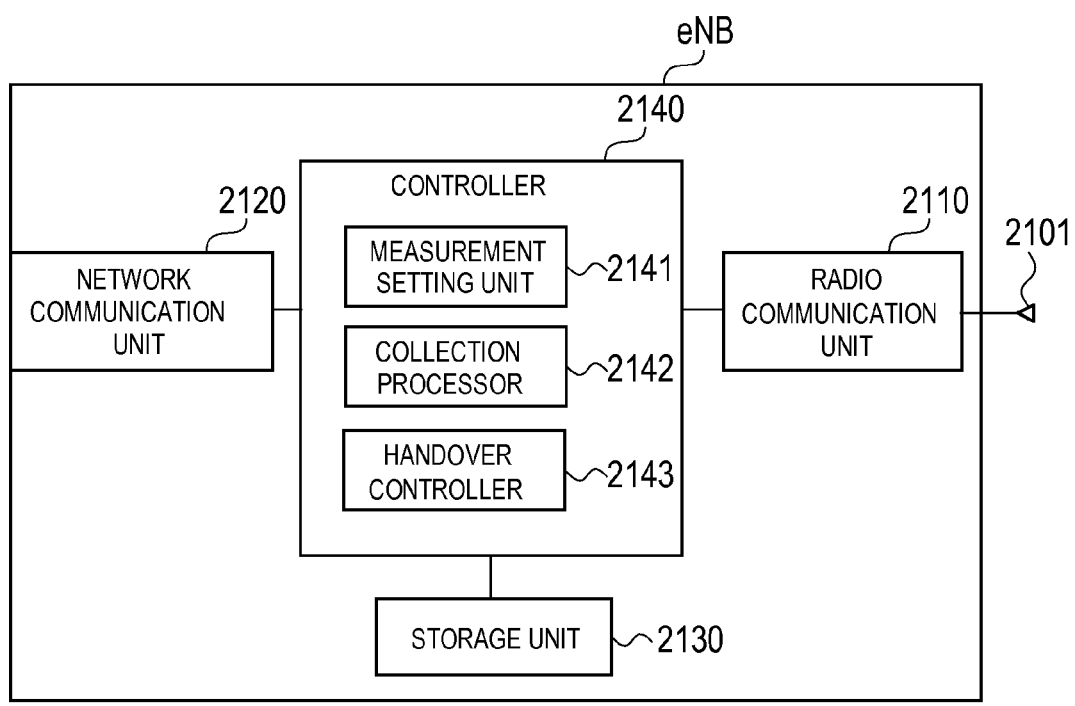
FIG. 10 is a block diagram illustrating a configuration of a radio base station according to the fourth embodiment of the present invention.

FIG. 10 is a block diagram illustrating a configuration of the radio base station eNB. Here, the radio base station eNB which conforms to the Rel-10 and supports the MDT is described.

As shown in FIG. 10, the radio base station eNB includes an antenna 2101, a radio communication unit 2110, a network communication unit 2120, a storage unit 2130, and a controller 2140.

The antenna 2101 is used for transmission/reception of a radio signal. The radio communication unit 2110 includes, for example, a radio frequency (RF) circuit, a baseband (BB) circuit, and the like, and transmits/receives a radio signal via the antenna 2101. Furthermore, the radio communication unit 2110 modulates a transmission signal and demodulates a reception signal. The network communication unit 2120 communicates with other network devices (the maintenance monitor device OAM, or other radio base stations eNB, and the like). The storage unit 2130 includes, for example, a memory, and stores therein various kinds of information used for control of the radio base station eNB and the like. The controller 2140 includes, for example, a CPU, and controls various kinds of functions provided by the radio base station eNB.

The controller 2140 includes a measurement setting unit 2141, a collection processor 2142, and a handover controller 2143.

The measurement setting unit 2141 sets a measurement configuration in the radio terminal UE. Specifically, the measurement setting unit 2141 generates a MEASUREMENT CONFIGURATION message including a measurement configuration. The measurement configuration includes a parameter indicating a type of radio environment to be measured, and a parameter indicating a type of report trigger. Examples of types of radio environments to be measured include a reference signal received power (RSRP) and a reference signal received quality (RSRQ), or a power headroom (PH). Examples of types of report triggers include a periodic trigger, an event in which the RSRP and/or the RSRQ of a serving cell becomes lower than a threshold value, or a radio link trouble. Then, the measurement setting unit 2141 take control to cause the radio communication unit 2110 to transmit the MEASUREMENT CONFIGURATION message to the radio terminal UE.

The collection processor 2142 performs processing of collecting a measurement result.

In the Immediate MDT, the collection processor 2142 acquires the measurement result and location information included in a MEASUREMENT REPORT message received from the radio terminal UE, and adds a timestamp to the measurement result and the location information. Then, the collection processor 2142 takes control to cause the network communication unit 2120 to transmit a set of the measurement result, the location information, and the timestamp to the maintenance monitor device OAM. Further, the collection processor 2142 may not only transmit these pieces of information to the maintenance monitor device OAM, but also may interpret and use the contents of the information for optimizing parameters of the own station. Furthermore, in the Immediate MDT, the collection processor 2142 may measure a signal strength or a signal-to-interference and noise ratio (SINR) in the uplink.

In the Logged MDT, when receiving an RRC Connection Setup Complete message which includes log holding information indicating that log data is held from the radio terminal UE and when determining to collect the log data, the collection processor 2142 take control to cause the radio communication unit 2110 to generate a UE Information Request message and transmit the generated UE Information Request message to the radio terminal UE.

When the radio communication unit 2110 receives a UE Information Response message transmitted (reported) from the radio terminal UE in response to the UE Information Request message, the collection processor 2142 acquires the log data included in the received UE Information Response message. Then, the collection processor 2142 takes control to cause the network communication unit 2120 to transmit the log data to the maintenance monitor device OAM. Further, the collection processor 2142 may not only transmit the log data to the maintenance monitor device OAM, but also interpret and use the contents of the log data for optimizing parameters of the own station.

The handover controller 2143 performs various kinds of controls about a handover. When deciding to perform a handover to a target base station, the handover controller 2143 takes control to cause the network communication unit 2120 to transmit a HANDOVER REQUEST message to the target base station. When the network communication unit 2120 receives a HANDOVER REQUEST ACK message in response to the HANDOVER REQUEST message, the handover controller 2143 takes control to cause the radio communication unit 2110 to transmit an RRC CONNECTION RECONFIGURATION message including a mobility control information to the radio terminal UE.

In addition, when the RRC CONNECTION RECONFIGURATION message is transmitted to the radio terminal UE while the Immediate MDT is executed with the radio terminal UE, the handover controller 2143 transmits the RRC CONNECTION RECONFIGURATION message in which information indicating whether or not the target base station supports the MDT is included. The information indicating whether or not the target base station supports the MDT may be one bit of information (flag). Specifically, if the target base station supports the MDT, the information (flag) is "1", while if the target base station does not support the MDT, the information (flag) is "0". Instead, a specification in which an option bit is set if the target base station supports the MDT may be applicable.

(4.3) Configuration of Radio Terminal

Figure 11:
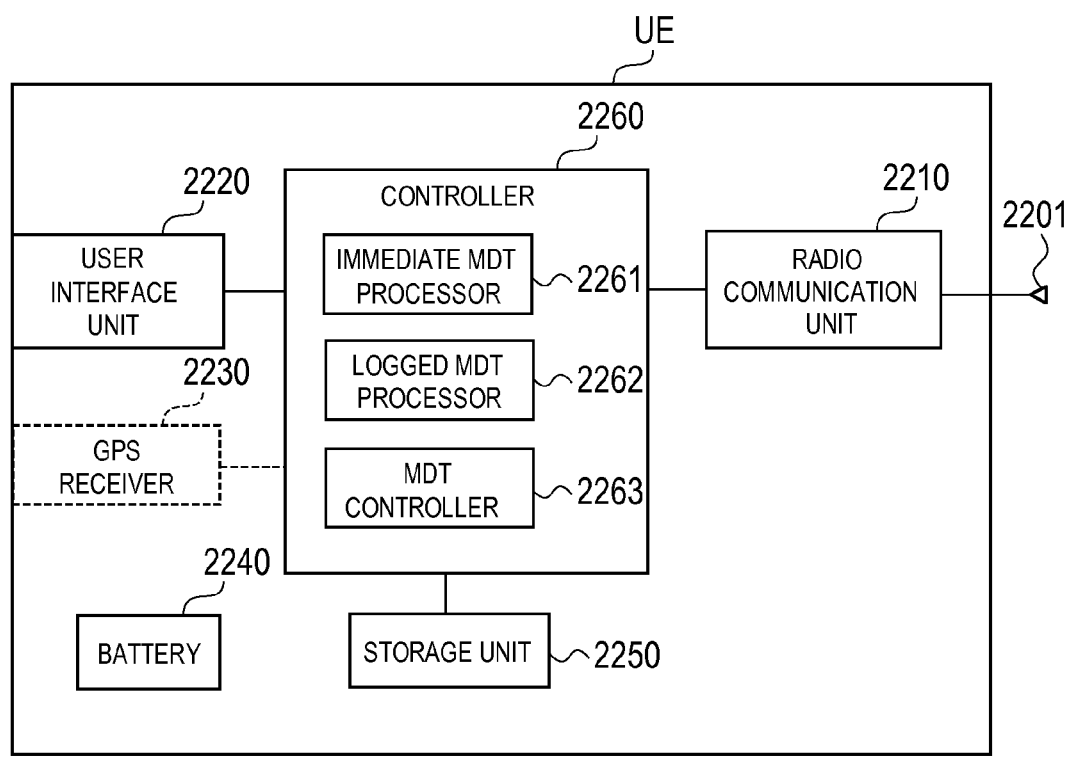
FIG. 11 is a block diagram illustrating a configuration of a radio terminal according to the fourth embodiment of the present invention.

FIG. 11 is a block diagram illustrating a configuration of the radio terminal UE.

As shown in FIG. 11, the radio terminal UE includes an antenna 22201, a radio communication unit 2102210, a user interface unit 2220, a GPS receiver 2230, a battery 2240, a storage unit 2250, and a controller 2260. Note that, the radio terminal UE may not include the GPS receiver 2230.

The antenna 22201 is used for transmission/reception of a radio signal. The radio communication unit 2102210 includes, for example, a radio frequency (RF) circuit, a baseband (BB) circuit, and the like, and transmits/receives a radio signal via the antenna 22201. Furthermore, the radio communication unit 2102210 modulates a transmission signal and demodulates a reception signal. The user interface unit 2220 is a display, a button, or the like functioned as an interface with a user. The battery 2240 stocks up on electric power to be supplied to each block in the radio terminal UE. The storage unit 2250 includes, for example, a memory, and stores therein various kinds of information used for control of the radio terminal UE. The controller 2260 includes, for example, a CPU, and controls various kinds of functions provided by the radio terminal UE.

The controller 2260 includes an Immediate MDT processor 2261, a Logged MDT processor 2262, and an MDT controller 2263. The Immediate MDT processor 2261 corresponds to a first measurement processor, the Logged MDT processor 2262 corresponds to a second measurement processor, and the MDT controller 2263 corresponds to a measurement controller.

The Immediate MDT processor 2261 performs an Immediate MDT with the radio base station eNB, in a connected mode. Specifically, when the radio communication unit 2102210 receives a MEASUREMENT CONFIGURATION message including a measurement configuration, in a connected mode, the Immediate MDT processor 2261 sets (in other words, stores in the storage unit 2250) the measurement configuration included in the received MEASUREMENT CONFIGURATION message. The measurement configuration includes a parameter indicating a type of radio environment to be measured, and a parameter indicating a type of report trigger.

Furthermore, the Immediate MDT processor 2261 performs a measurement of a radio environment in accordance with the parameter indicating a type of radio environment to be measured, and generates location information about a location when the measurement is performed. The location information includes an ECGI (E-UTRAN Cell Global Identifier) of a serving cell. Furthermore, if the radio terminal UE has a positioning function, the location information further includes GNSS (Global Navigation Satellite System) location information. On the other hand, if the radio terminal UE has no positioning function, the location information further includes an RF (Radio frequency) fingerprint about a receiving condition from a neighboring cell.

Then, the Immediate MDT processor 2261 takes control to cause the radio communication unit 2102210 to transmit the MEASUREMENT REPORT message including the measurement result to which the location information is added to a source base station eNB in accordance with the parameter indicating a type of report trigger.

The Logged MDT processor 2262 performs a Logged MDT (hereinafter, referred to as Logged MDT in connected as appropriate) in a connected mode. The Logged MDT processor 2262 performs a measurement in accordance with the measurement configuration set by the radio base station eNB, and stores a measurement result and location information. Specifically, the Logged MDT processor 2262 performs measurements of the RSRP and the RSRQ, or the PH in accordance with the parameter indicating a type of radio environment to be measured included in the MEASUREMENT CONFIGURATION message. Furthermore, the Logged MDT processor 2262 generates location information about a location when the measurement is performed and a timestamp about a time when the measurement is performed. Then, the radio terminal UE stores (stores in the storage unit 2250) a set of the measurement result, the location information, and the timestamp as log data.

The MDT controller 2263 controls the Immediate MDT processor 2261 and the Logged MDT processor 2262. The MDT controller 2263 switches from the Immediate MDT to the Logged MDT in connected in response to a trigger of a handover from the radio base station eNB to a target base station. Specifically, the MDT controller 2263 switches from the Immediate MDT to the Logged MDT in connected when the radio communication unit 2102210 receives the RRC CONNECTION RECONFIGURATION message from the radio base station eNB, in other words, an instruction of a handover from the radio base station eNB, which serves as a trigger of a handover.

The MDT controller 2263 determines whether or not the target base station supports the MDT based on the information indicating whether or not the target base station supports the MDT included in the RRC CONNECTION RECONFIGURATION message. For example, the MDT controller 2263 determines whether or not the target base station supports the MDT from system information notified by the target base station or target base station information notified by the source base station. If determining that the target base station supports the MDT, the MDT controller 2263 continues the Immediate MDT. On the other hand, the target base station does not support the MDT, the radio terminal UE switches from the Immediate MDT to the Logged MDT in connected.

Figure 12:
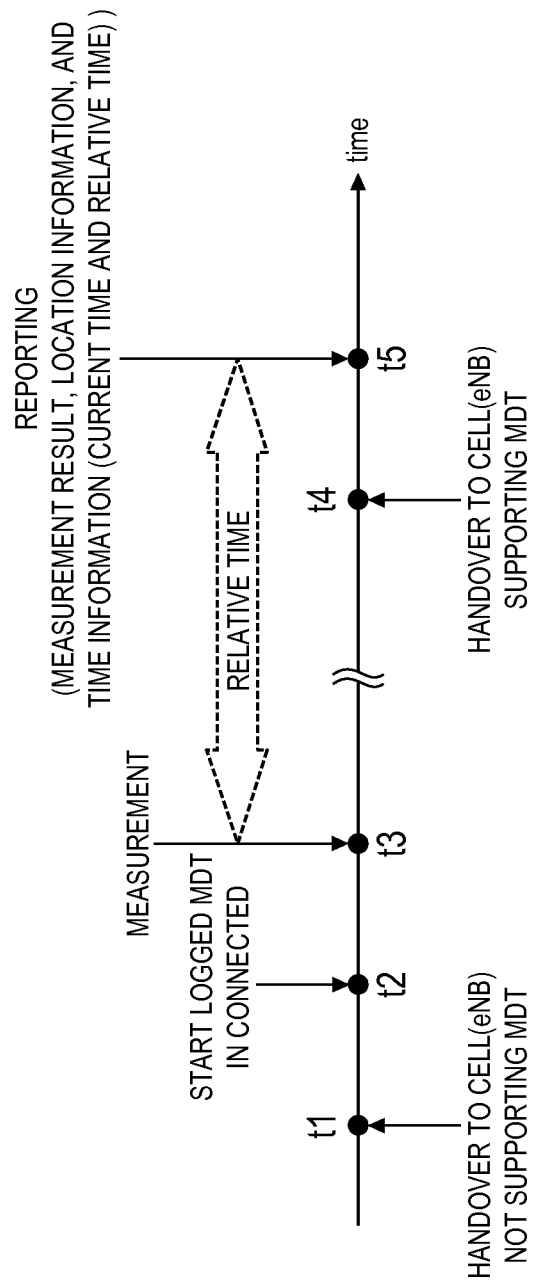
FIG. 12 is a time chart for explaining operations of the radio terminal during and after switching from the Immediate MDT to a Logged MDT in connected according to the fourth embodiment of the present invention.

FIG. 12 is a time chart for explaining operations of the radio terminal UE during and after switching from the Immediate MDT to the Logged MDT in connected.

As shown in FIG. 12, at a time t1, the radio terminal UE performs a handover to a radio base station (cell) not supporting the MDT. Here, the MDT controller 2263 starts up a timer for measuring a certain period of time before the Logged MDT in connected is started. Further, the timer is used in consideration of a case in which immediate after performing the handover to a radio base station (cell) not supporting the MDT, the radio terminal UE performs a handover to the handover source radio base station (cell) or the like again.

At a time t2, upon expiration of the timer for measuring the certain period of time before the Logged MDT in connected, the MDT controller 2263 instructs the Logged MDT processor 2262 to start the Logged MDT in connected. The Logged MDT processor 2262 starts the Logged MDT in connected in accordance with the measurement configuration set by the radio base station eNB, or the measurement configuration set in advance.

At a time t3, when detecting an occurrence of an event corresponding to a measurement trigger, the Logged MDT processor 2262 measures a radio environment. Furthermore, the Logged MDT processor 2262 acquires location information on a location at a time when the event occurs (that is, when the measurement is performed), and stores the measurement result of the radio environment and the location information. In addition, the Logged MDT processor 2262 stores information indicating an absolute time managed inside the radio terminal UE (that is, information indicating the time t3).

At a time t4, the radio terminal UE performs a handover from the radio base station (cell) not supporting the MDT to a radio base station (cell) supporting the MDT.

At a time t5, the Logged MDT processor 2262 reports the measurement result to the radio base station supporting the MDT. As for a method and procedure for reporting a log collected in the Logged MDT in connected, both of the following methods and the like can be considered: a method of transmitting the log in a manner similar to a normal RRM measurement report, when the radio terminal UE moves to the base station supporting the MDT, as in the case with the Immediate MDT currently defined by the 3GPP; and a method in which one bit of log holding information is included in the RRC Connection Setup Complete message and the log is acquired in accordance with the determination by a network, as is the case with a Logged MDT in idle. Here, the Logged MDT processor 2262 reports the measurement result, the location information, and time information when the measurement is performed at the time t3. The time information includes information indicating the absolute time (Day, Hour, Min, Sec) managed inside the radio terminal UE (that is, time information corresponding to the time t5), and information indicating a relative time between the time t5 and the time t3. If the Logged MDT in connected is not the measurement configuration set by the radio base station eNB, the absolute time managed inside the radio terminal UE is not sufficiently reliable. Therefore, the base station calculates a gap between the report time t5 by the radio terminal UE and the absolute time in the network to rewrite the report at the time t3 to reliable information. In this manner, the radio base station which receives a report can be calculate, from the absolute time and the relative time when the report is received, time information (Day, Hour, Min, Sec) corresponding to the time when the measurement is performed in accordance with the absolute time in the network.

(4.4) Radio Measurement Collection Method

Figure 13:
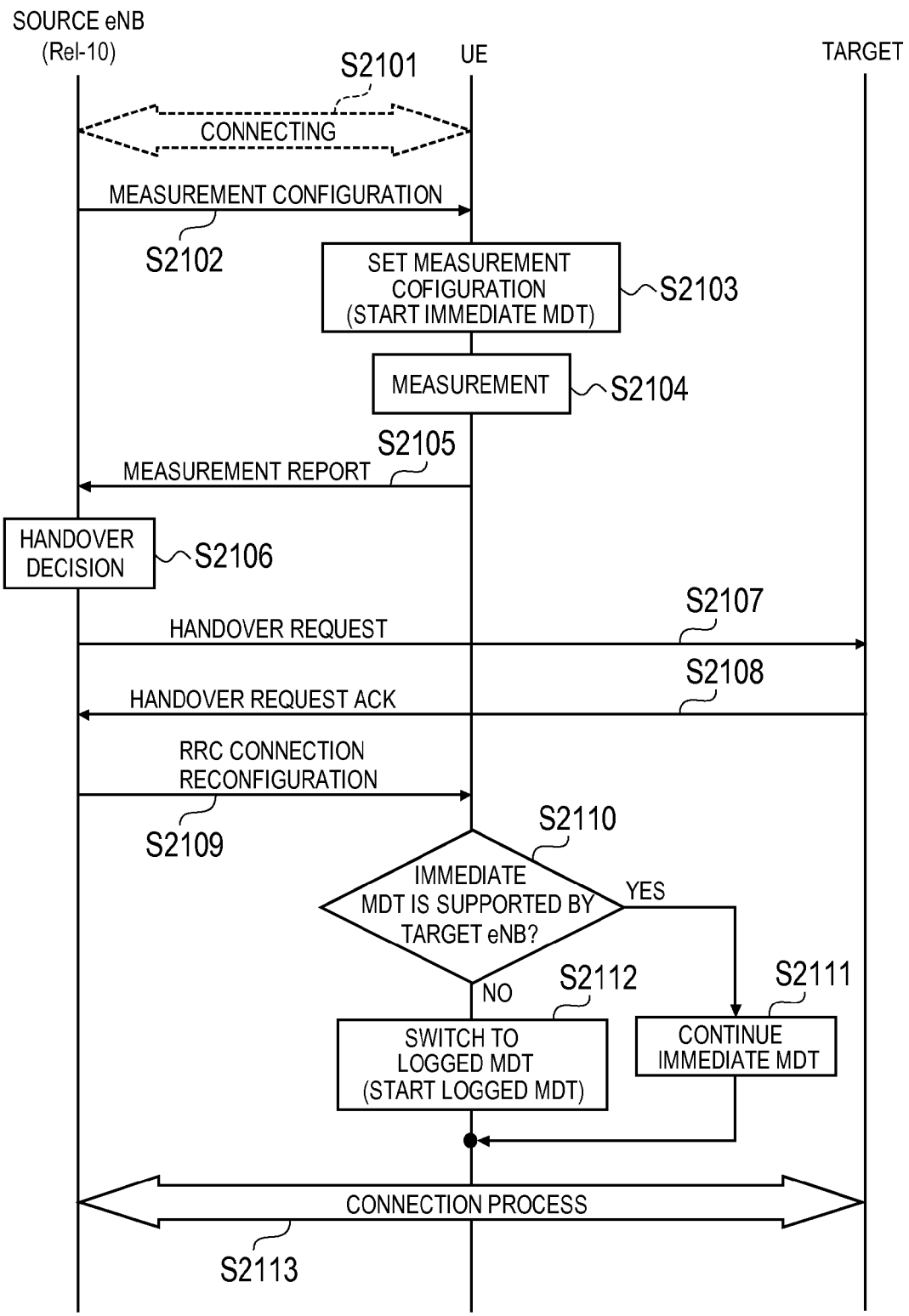
FIG. 13 is a sequence diagram indicating a radio measurement collection method according to the fourth embodiment.

FIG. 13 is a sequence diagram indicating a radio measurement collection method according to the fourth embodiment. Here, description is provided for a case where a handover from a radio base station eNB supporting the MDT to another radio base station is performed. Furthermore, the radio base station eNB supporting the MDT is referred to as a source base station eNB, and the another radio base station is referred to as a target base station.

As shown in FIG. 13, in Step S2101, the radio terminal UE is in a connected mode, and uses a cell in the source base station eNB as a serving cell.

In Step S2102, the source base station eNB transmits a MEASUREMENT CONFIGURATION message to the radio terminal UE. The radio terminal UE receives the MEASUREMENT CONFIGURATION message.

In Step S2103, the radio terminal UE stores therein measurement configuration included in the received MEASUREMENT CONFIGURATION message, and starts an Immediate MDT. The measurement configuration includes a parameter indicating a type of radio environment to be measured and a parameter indicating a type of report trigger.

In Step S2104, the radio terminal UE performs a measurement of a radio environment in accordance with the parameter indicating a type of radio environment to be measured. The radio environment includes, for example, a reference signal received power (RSRP) and a reference signal received quality (RSRQ), or a power headroom (PH). Further, the source base station eNB may measure a signal strength or a signal-to-interference and noise ratio (SINR) in the uplink. Furthermore, the radio terminal UE generates location information on a location when the measurement is performed. The location information includes an ECGI (E-UTRAN Cell Global Identifier) of the serving cell. Furthermore, if the radio terminal UE has a positioning function, the location information further includes GNSS (Global Navigation Satellite System) location information. On the other hand, if the radio terminal UE has no positioning function, the location information further includes an RF (Radio frequency) fingerprint about a receiving condition from a neighboring cell.

In Step S2105, the radio terminal UE transmits a MEASUREMENT REPORT message including the measurement result to which the location information is added to the source base station eNB in accordance with the parameter indicating a type of report trigger. For example, when the RSRP and the RSRQ are measured, the type of report trigger is a periodic trigger, an event in which the RSRP and/or the RSRQ of the serving cell becomes lower than a threshold value, or, a radio link trouble. The source base station eNB receives the MEASUREMENT REPORT message. Furthermore, the source base station eNB stores therein the measurement result, in the MEASUREMENT REPORT message, to which the location information is added. The source base station eNB transmits the measurement result to which the location information is added to the maintenance monitor device OAM.

In Step S2106, the source base station eNB decides to perform a handover to a target base station in response to the measurement result included in the MEASUREMENT REPORT message.

In Step S2107, the source base station eNB transmits a HANDOVER REQUEST message to the target base station. The target base station determines whether or not to accept the radio terminal UE in response to the HANDOVER REQUEST message.

In Step S2108, when determining that the radio terminal UE is accepted, the target base station transmits a HANDOVER REQUEST ACK message indicating the determination to the source base station eNB. The source base station eNB receives the HANDOVER REQUEST ACK message.

In Step S2109, the source base station eNB transmits an RRC CONNECTION RECONFIGURATION message including mobility control information to the radio terminal UE. The radio terminal UE receives the RRC CONNECTION RECONFIGURATION message, and is instructed a handover to the target base station by the source base station eNB. In the present embodiment, in Step S2109, the source base station eNB transmits the RRC CONNECTION RECONFIGURATION message by including information indicating whether or not the target base station supports the MDT. The information indicating whether or not the target base station supports the MDT may be one bit of information (flag). Specifically, if the target base station supports the MDT, the information (flag) is "1", and if the target base station does not support the MDT, the information (flag) is "0". Furthermore, a specification in which an option bit is set if the target base station supports the MDT may be applicable.

In Step S2110, the radio terminal UE determines whether or not the target base station supports the MDT based on target base station information included in the RRC CONNECTION RECONFIGURATION message and the like.

If determining that the target base station supports the MDT, the radio terminal UE continues the Immediate MDT in Step S111. When continuing the Immediate MDT, the radio terminal UE receives the MEASUREMENT CONFIGURATION message from the target base station after the handover.

On the other hand, if determining that the target base station does not support the MDT, the radio terminal UE switches from the Immediate MDT to the Logged MDT in connected in Step S2112. Specifically, the radio terminal UE performs measurements of the RSRP and the RSRQ, or the PH in accordance with the parameter indicating a type of radio environment to be measured included in the MEASUREMENT CONFIGURATION message received in Step S2102. Furthermore, the radio terminal UE generates location information about a location when the measurement is performed and a timestamp about a time when the measurement is performed. Then, the radio terminal UE stores a set of the measurement result, the location information, and the timestamp as log data. The radio terminal UE may store such log data on a periodic basis. Further, when performing a handover from the target base station to still another target base station, the radio terminal UE may report the stored log data to the still another target base station if the still another target base station supports the MDT.

Further, as for a method and procedure for reporting a log collected in the Logged MDT in connected, both of the following methods and the like can be considered: a method for transmitting the log in a manner similar to a normal RRM measurement report when the radio terminal UE moves to the base station supporting the MDT, as is the case with the Immediate MDT currently defined by the 3GPP, and a method in which one bit of log holding information is included in the RRC Connection Setup Complete message and the log is acquired in accordance with the determination by a network, as is the case with a Logged MDT in idle.

In Step S113, the radio terminal UE performs connection processing with the target base station. Specifically, the radio terminal UE establishes synchronization with the target base station or performs various kinds of negotiation. If the connection processing is completed, the handover is completed.

(4.5) Effects of Fourth Embodiment

As described above, according to the fourth embodiment, the radio terminal UE switches from the Immediate MDT to the Logged MDT in connected in response to a trigger of a handover to a target base station not supporting the MDT. This enables the measurement processing to be continued so that the radio environment during the handover or after the handover can be measured. Therefore, measurement results and location information necessary for optimization can be collected sufficiently.

Furthermore, in the fourth embodiment, the radio terminal UE switches from the Immediate MDT to the Logged MDT in connected if determining that the target base station does not support the MDT. Accordingly, the radio terminal UE can switch to the Logged MDT in connected after confirming that the target base station does not support the MDT. Therefore, the Immediate MDT can be continued if the target base station supports the MDT.

In addition, in the fourth embodiment, the radio terminal UE switches from the Immediate MDT to the Logged MDT in connected when receiving an instruction of a handover from the radio base station eNB, which serves as a trigger of a handover. Accordingly, the radio terminal UE can switch from the Immediate MDT to the Logged MDT in connected in response to the instruction of a handover from the source base station eNB. Therefore, a radio environment during the handover or after the handover can be measured more reliably.

In the fourth embodiment, the radio terminal UE receives information indicating whether or not the target base station supports the MDT from the source base station eNB, and switches from the Immediate MDT to the Logged MDT in connected based on the received information. Accordingly, whether or not the target base station supports the Immediate MDT can be determined more reliably.

(4.6) Modification Example of Fourth Embodiment

In the fourth embodiment described above, the radio terminal UE receives information indicating whether or not the target base station supports the MDT from the source base station eNB, and switches from the Immediate MDT to the Logged MDT in connected based on the received information.

In the present modification example, the radio terminal UE receives information notified by the target base station, and switches from the Immediate MDT to the Logged MDT in connected based on the received information.

FIG. 14 is a sequence diagram of a radio measurement collection method according to the present modification example. Here, a difference point from the fourth embodiment described above is mainly described.

In Step S2201, the radio terminal UE receives information notified by the target base station (in other words, notification information). Further, the target base station notifies the notification information periodically. The notification information includes a master information block (MIB) and a system information block (SIB). The SIB includes information on a release (version) with which the target base station is in conformity.

In Step S2110, the radio terminal UE determines whether or not the target base station supports the MDT based on the information included in the SIB. Specifically, the radio terminal UE determines whether or not the target base station supports the MDT from the information on a release (version) with which the target base station is in conformity. In this case, if the target base station conforms to a release (version) of the Rel-10 or later, the target base station is determined to support the Immediate MDT.

Other processing is similar to that of the fourth embodiment described above.

According to the present modification example, the radio terminal UE determines whether or not the target base station supports the MDT based on the information included in the SIB notified by the target base station. Accordingly, the accuracy of determining whether or not the target base station supports the MDT is lower than that of the first fourth embodiment described above. However, existing information included in the SIB can be utilized, which leads to the minimum change to the existing system.

(5) Other Embodiments

As described above, the present invention has been described by the embodiments. However, it should not be understood that the description and drawings which constitute this disclosure limit the invention. Various alternative embodiments, examples, and operational techniques will be apparent for those skilled in the art.

In the first to third embodiments described above, the radio terminal UE activates the timer when the measurement is performed. However, the timing of activating the timer may be other timing. For example, the radio terminal UE may activate a timer when it is detected that a measurement result cannot be reported to a radio base station eNB. Alternatively, the radio terminal UE may activate a timer when it is detected that a period during which measurement result cannot be transmitted to a radio base station eNB has continued for a certain period of time since the timing when the measurement is performed.

In the fourth embodiment described above, after switching from the Immediate MDT to the Logged MDT in connected, the radio terminal UE performs the Logged MDT in connected in accordance with the measurement configuration for the Immediate MDT. In other words, in FIG. 13, after switching to the Logged MDT in connected in Step S2112, the radio terminal UE performs the Logged MDT in connected using the measurement configuration set in Step S2103. However, the radio terminal UE may automatically generate a measurement configuration for the Immediate MDT in accordance with the regulation set in advance of the measurement configuration, after switching from the Immediate MDT to the Logged MDT in connected.

Alternatively, the source base station eNB may transmit a measurement configuration for the Logged MDT in connected when transmitting the RRC CONNECTION RECONFIGURATION message to the radio terminal UE in Step S2109. The measurement configuration for the Logged MDT in connected may include a measured target (measurements to be logged), a measurement trigger (triggering of logging event), a measurement duration (total duration of logging), a timestamp (network absolute timestamp), a measurement area (measurements area), and an absolute time.

In this case, the radio terminal UE measures a radio environment in accordance with the MEASUREMENT CONFIGURATION message during a measurement duration after switching to the Logged MDT in connected, and holds log data including the measurement result. Specifically, the radio terminal UE starts up a timer for the measurement duration (duration timer) when setting the measurement configuration for the Logged MDT in connected, and completes storing of the log data when the timer is expired.

Then, when connecting to the radio base station which supports to receive a MEASUREMENT REPORT message, the radio terminal UE sends the radio base station log holding information (which is referred to as Availability Indicator) indicating that log data is held. Specifically, the radio terminal UE transmits an RRC Connection Setup Complete message indicating that the connection is completely established by including the log holding information. The radio base station transmits a UE Information Request message, which is a request message requesting a report of the log data, to the radio terminal UE, based on the received log holding information. Upon receiving the UE Information Request message, the radio terminal UE transmits a UE Information Response message including the held log data.

In the fourth embodiment described above, the radio terminal UE switches from the Immediate MDT to the Logged MDT in connected in response to an instruction of a handover from the source base station eNB, which serves as a trigger of a handover. Alternatively, the radio terminal UE may switch from the Immediate MDT to the Logged MDT in connected in response to transmission of the MEASUREMENT REPORT message to the source base station eNB, which serves as a trigger of a handover.

As described above, it should be understood that the present invention contains various embodiments which are not described herein.

Note that the entire contents of the U.S. provisional application No. 61/385,073 (filed on Sep. 21, 2010) and the U.S. provisional application No. 61/385,085 (filed on Sep. 21, 2010) are incorporated herein by reference.

INDUSTRIAL APPLICABILITY

As described above, the radio measurement collection method and the radio terminal according to the present invention are useful for radio communication such as mobile communication, by the case can be properly handled where the measurement result cannot be reported in the immediate-report-type MDT, and measurement results and location information necessary for optimization can be collected sufficiently.

The invention claimed is:

1. A radio measurement collection method used in a radio terminal, comprising:
  receiving a measurement configuration from a network;
  initiating an immediate type-MDT (Minimization of Drive Test) measurement processing based on the measurement configuration, in a radio resource control (RRC) connected state;
  performing a handover after initiating the immediate type-MDT measurement processing from a radio base station that supports MDT to a radio base station that does not support MDT;
  in response to the handover to the radio base station that does not support the MDT, switching from the immediate type-MDT measurement processing to a logged type-MDT measurement processing in the RRC connected state;
  performing the logged type-MDT measurement processing in the RRC connected state following the handover; and
  reporting logged data to the network, wherein
  in the logged type-MDT measurement processing in the RRC connected state, the radio terminal performs measurement of a radio environment in accordance with the measurement configuration in the RRC connected state and logs the measurement in the RRC connected state.

2. The radio measurement collection method according to claim 1, wherein
  the logged type-MDT measurement processing includes the steps of:
  measuring a radio environment in accordance with the measurement configuration and storing a measurement result and location information of the radio terminal.

3. The radio measurement collection method according to claim 1, wherein
  the radio terminal initiates the immediate type-MDT measurement processing in response to a reception of broadcast information from the network, in the connected state.

4. A radio terminal, comprising:
  a receiver that receives a measurement configuration from a network; and
  a controller that:

initiates an immediate type-MDT (Minimization of Drive Test) measurement processing based on the measurement configuration, in a radio resource control (RRC) connected state;

performs a handover after initiating the immediate type-MDT measurement processing from a radio base station that supports MDT to a radio base station that does not support MDT;

in response to the handover to the radio base station that does not support the MDT, switches from the immediate type-MDT measurement processing to a logged type-MDT measurement processing in the RRC connected state;

performs the logged type-MDT measurement processing in the RRC connected state following the handover; and reports logged data to the network, wherein in the logged type-MDT measurement processing in the RRC connected state, the radio terminal performs measurement of a radio environment in accordance with the measurement configuration in the RRC connected state and logs the measurement in the RRC connected state.

5. The radio measurement collection method according to claim 1, wherein the radio terminal receives the measurement configuration for the logged type-MDT measurement processing, in the connected state, the measurement configuration for the immediate type-MDT measurement processing includes a parameter indicating a measurement area.

6. A processor for a radio terminal, executing:

receiving a measurement configuration from a network;

initiating an immediate type-MDT (Minimization of Drive Test) measurement processing based on the measurement configuration, in a radio resource control (RRC) connected state;

performing a handover after initiating the immediate type-MDT measurement processing from a radio base station that supports MDT to a radio base station that does not support MDT;

in response to the handover to the radio base station that does not support the MDT, switching from the immediate type-MDT measurement processing to a logged type-MDT measurement processing in the RRC connected state;

performing the logged type-MDT measurement processing in the RRC connected state following the handover; and reporting logged data to the network, wherein in the logged type-MDT measurement processing in the RRC connected state, the radio terminal performs measurement of a radio environment in accordance with the measurement configuration in the RRC connected state and logs the measurement in the RRC connected state.

* * * * *